`US011675922B2`

United States Patent
Hennig et al.

(10) Patent No.: US 11,675,922 B2
(45) Date of Patent: Jun. 13, 2023

(54) SECURE STORAGE OF AND ACCESS TO FILES THROUGH A WEB APPLICATION

(71) Applicants: Bundesdruckerei GMBH, Berlin (DE); NEXENIO GMBH, Berlin (DE)

(72) Inventors: Patrick Hennig, Berlin (DE); Maxim Schnjakin, Berlin (DE); Philipp Berger, Berlin (DE); Manfred Paeschke, Wandlitz (DE)

(73) Assignee: Bundesdruckerei GMBH, Berlin (DE)

( * ) Notice: Subject to any disclaimer, the term of this patent is extended or adjusted under 35 U.S.C. 154(b) by 268 days.

(21) Appl. No.: 16/958,919

(22) PCT Filed: Dec. 20, 2018

(86) PCT No.: PCT/EP2018/086188
§ 371 (c)(1),
(2) Date: Aug. 28, 2020

(87) PCT Pub. No.: WO2019/129642
PCT Pub. Date: Jul. 4, 2019

(65) Prior Publication Data
US 2020/0401718 A1   Dec. 24, 2020

(30) Foreign Application Priority Data
Dec. 31, 2017 (DE) ............... 10 2017 223 898.4

(51) Int. Cl.
*G06F 21/62* (2013.01)
*G06F 11/07* (2006.01)
(Continued)

(52) U.S. Cl.
CPC ...... *G06F 21/6218* (2013.01); *G06F 11/0727* (2013.01); *G06F 21/602* (2013.01);
(Continued)

(58) Field of Classification Search
CPC .................................................. G06F 21/6218
See application file for complete search history.

(56) References Cited

U.S. PATENT DOCUMENTS 8,370,312 B1 *  2/2013  Sawhney .......... H04L 67/1001
                                                  707/694
2005/0240749 A1  10/2005  Clemo et al.
(Continued)

FOREIGN PATENT DOCUMENTS

WO   WO-2011/157708 A1   12/2011
WO   WO-2014/108183 A1   7/2014

OTHER PUBLICATIONS

International Search Report PCT/ISA/210 for International Application No. PCT/EP2018/086188 dated Mar. 6, 2019.
(Continued)

*Primary Examiner* — Esther B. Henderson
(74) *Attorney, Agent, or Firm* — Harness, Dickey & Pierce, P.L.C.

(57) ABSTRACT

The invention relates to a method for cryptographically secure storing a file (101) using a web application executed by a web browser (106) on a user computer system (104, 162, 168) of a user (102, 160). The method comprises:
encrypting the file (101) on the user computer system (104, 162, 168) by the web application,
providing a distribution plan by the web application,
fragmenting the encrypted file (101) on the user computer system (104, 162, 168) by the web application into a plurality of file fragments (F1-F4) according to the distribution plan,
sending the resulting file fragments (F1-F4) by the web application over the network (178) to the storage services identified by the distribution plan (SD1-SD6).

20 Claims, 11 Drawing Sheets

Figure 1:
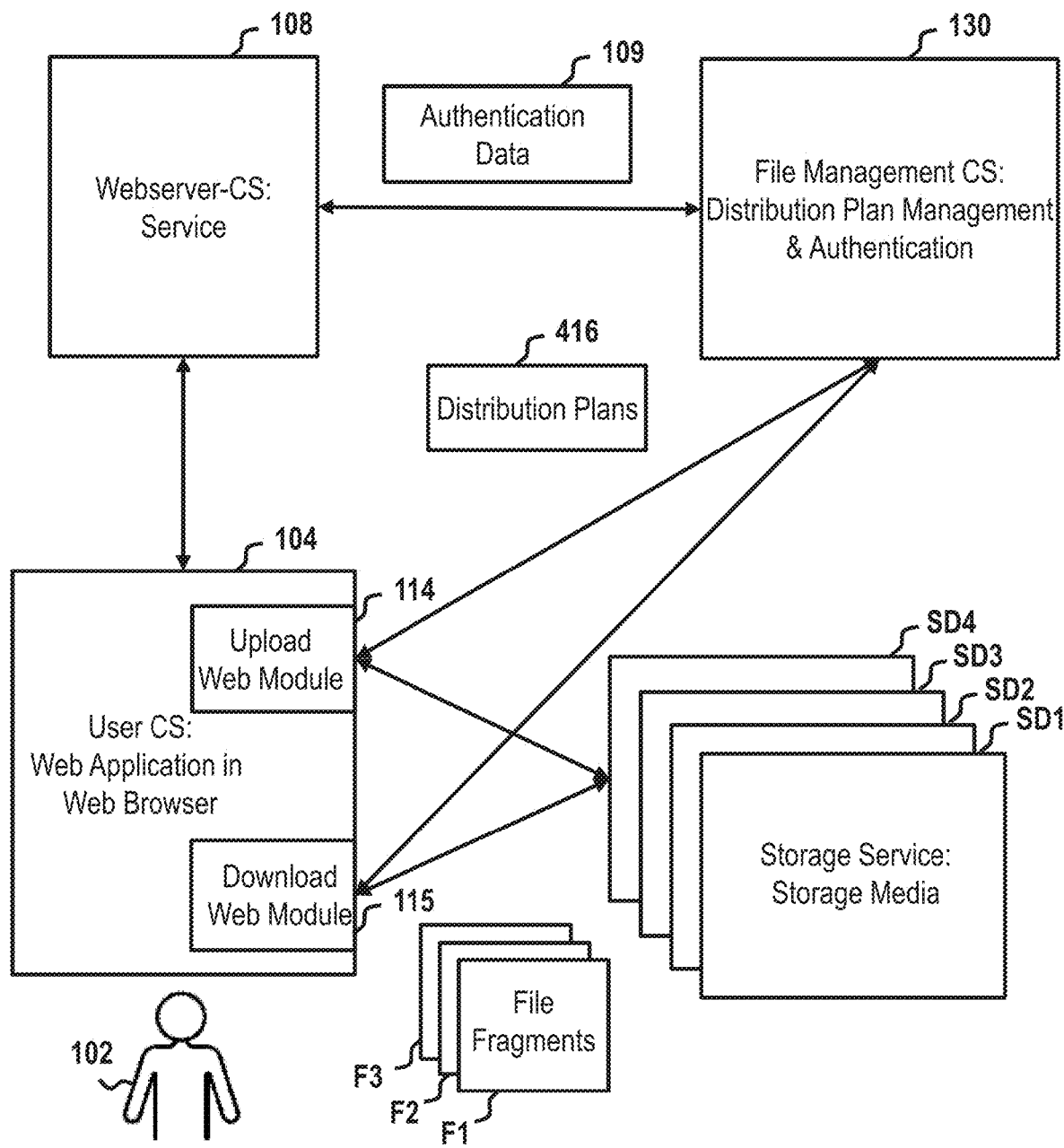

(51) Int. Cl.
*G06F 21/60* (2013.01)
*G06F 21/78* (2013.01)
*H04L 67/02* (2022.01)
*H04L 67/1097* (2022.01)

(52) U.S. Cl.
CPC .............. *G06F 21/78* (2013.01); *H04L 67/02* (2013.01); *H04L 67/1097* (2013.01); *G06F 2221/0711* (2013.01); *G06F 2221/0751* (2013.01); *G06F 2221/2107* (2013.01)

(56) References Cited

U.S. PATENT DOCUMENTS

2008/0060085 A1    3/2008  Samzelius et al.
2017/0293766 A1*  10/2017  Schnjakin ............. H04L 63/102

OTHER PUBLICATIONS

Written Opinion PCT/ISA/237 for International Application No. PCT/EP2018/086188 dated Mar. 6, 2019.
International Preliminary Report and Written Opinion for PCT/EP2018/096188 dated Jul. 9, 2020.

* cited by examiner

SECURE STORAGE OF AND ACCESS TO FILES THROUGH A WEB APPLICATION

CROSS-REFERENCE TO RELATED APPLICATIONS

This application is a national phase under 35 U.S.C. § 371 of PCT International Application No. PCT/EP2018/086188 which has an International filing date of Dec. 20, 2018, which claims priority to German Application No. 10 2017 223 898.4, filed Dec. 31, 2017, the entire contents of each of which are hereby incorporated by reference.

The invention relates to a method for storing a file, a user computer system, a web server computer system and a file management server computer system.

Various methods for storing user data by means of one or more external storage services are known from the state of the art, e.g. "OneDrive", "Dropbox", "Google Drive" and others. The storage services differ with regard to the security of the data stored there (different authentication and encryption methods), with regard to data availability and/or with regard to other factors. In some cases, the storage services also offer different usage contracts with different scope of services, which may also change after some time. Due to the effort involved in registering with each individual storage service, often only one service is used to store data externally, e.g. for backup purposes.

However, the use of only one service means that all of the user's data is concentrated in one storage service and there is a risk that in the event of a security breach, all of the data will fall into the hands of unauthorized third parties. Furthermore, in this case the storage service provider has full access to all data of the user, who thus loses control over who has access to his personal data.

Furthermore, the use of corresponding storage services usually requires a client application installed on the user computer system used by the user, through which the user gains access to his data. If the user uses a different computer system that does not have the corresponding client application, problems may occur when accessing his data.

Finally, the aforementioned storage services are generally storage services whose functionality, in addition to other functionalities such as installed applications or web applications, must be integrated into the program sequences of the user computer system or executed by the user, if the user wants to store the data used and/or generated when executing the corresponding applications or web applications.

Accordingly, the invention has as its object to provide for an improved method for storing data, a user computer system, a web server computer system, and a file management server computer system for this purpose.

The object is achieved by the features of the independent patent claims. Preferred embodiments of the invention are given in the dependent claims. The embodiments presented below can be freely combined with each other, provided they are not mutually exclusive.

Embodiments include a method for cryptographically secure storing a file using a web application. The web application is executed by a web browser on a user computer system.

The method comprises:
invoking the web application from a web server computer system over a network by the web browser on the user computer system,
encrypting the file with a cryptographic key on the user computer system using the web application,
providing a distribution plan by the web application, wherein the distribution plan comprises instructions for fragmenting the file into a plurality of file fragments by means of an error correction method and identifiers of a plurality of mutually independent storage services in whose non-volatile storage media the generated file fragments are to be stored,
fragmenting the encrypted file on the user computer system by the web application into a plurality of file fragments by the error correction method according to the distribution plan, wherein at least one of the file fragments includes error correction bits,
sending the resulting file fragments by the web application over the network to the storage services identified by the distribution plan, wherein an authorization token is provided by the web server computer system for each of the storage services as proof of authorization to store the corresponding file fragment.

Securely placed files are encrypted locally in the web browser on the user client computer system, split into individual fragments and uploaded to independent storage providers.

Embodiments can have the advantage of enabling data to be stored using a web application, i.e. without the need to install an application or a program beforehand. This enables flexible access to the corresponding data from any user computer system. The only requirement is a web browser that is configured to run the corresponding web application. In particular, embodiments enable the use of a user computer system in the form of a mobile, portable telecommunication system. This means that the stored data may be accessed at any time, regardless of location, even when on the move.

Confidential files of the user are not deposited in their entirety with a single third party, such as a single cloud storage provider. In addition, the individual file fragments are stored or retained in an encrypted form.

This method may be advantageous because the storage of file fragments generated by an error correction method in different storage services may increase the availability of the data to be stored. Furthermore, it may also increase the security of the data against unauthorized access by the storage service: error correction methods generate file fragments which contain correction bits and thus, depending on the proportion of correction bits in the fragments and depending on the number of file fragments generated, allow reconstruction of the original file should one or more of the Storage Services fail temporarily or permanently. However, none of the storage services may reconstruct the data, since no storage service receives all the file fragments. But even if an unauthorized third party should gain access to a majority of the file fragments, the encryption of the fragmented file may prevent him from drawing conclusions about the content of the file fragments. According to embodiments, the plaintext blocks of the file are encrypted dependent on each other in a course of symmetric encryption. This may prevent an unauthorized third party from being able to decrypt a part of the source file from individual fragments of the file, even if he should come into possession of the symmetric key for decrypting the file.

For example, a block cipher method, such as AES or DES, is used for symmetrical encryption, which is based on iterated block ciphers, whereby the processing of the input is carried out in several rounds, for example. Such a round may, for example, comprise three phases: 1. a linkage with a round key, 2. a substitution, which is built up from S-Boxes, for example, to create confusion, and 3. a permutation of the text bits of the file to be encrypted to implement a diffusion of the information, so that the output of an S-Box is distributed over several S-Boxes in the next round and over the entire text block after further rounds. Confusion may make the relationship between the encrypted file, i.e. the ciphertext, and the unencrypted file, i.e. the plaintext, more complex. By diffusion the information at one point of the plaintext block may be distributed over the whole ciphertext block, so that at the end every bit of the ciphertext block depends on every bit of the plaintext block. For example, the block-oriented encryption algorithm used is based on Cipher Block Chaining (CBC), Cipher Feedback (CFB) or Output Feedback (OFB). For example, DES, Camellia, RC2, 3DES, FEAL, RC6, AES, Blowfish, Serpent, IDEA, Twofish, Skipjack, CAST, MARS, TEA, or XTEA are used for symmetric encryption.

The security due to unauthorized access by the storage service operator may be increased in a synergistic way by a strict separation of access management by the file management server computer system in the form of requesting the authorization tokens and forwarding them on the one hand and data management by the individual storage services on the other hand: the file fragments are stored directly in the storage services by the user system, bypassing the file management server computer system. The File Management Server computer system does not act as a router, but merely mediates the authorization tokens that allow the user computer system to store the file fragments via the Storage Services. The File Management Server computer system therefore has no access to the contents of the transferred file fragments. The Storage Services, in turn, do not have the reference data needed to reconstruct the file. This reference data is only accessible to the user computer system and/or the File Management Server computer system. In addition, the method may store externally much faster than conventional methods: in order to have at least one backup copy of a file available externally, a copy of this file had to be transferred to an external storage service. If this external service failed, the backup copy was lost or at least temporarily unavailable. According to the invention, however, file fragments are stored by means of several storage services. This enables the file fragments to be transferred in parallel over the network. With parallel transmission of the file fragments, the entire information content of the file, including the error correction bits, may be transmitted within a fraction of the time that would be required to transmit an entire file copy to a single storage service. In addition, due to the error correction bits, the file is not lost in case one of the storage services should fail, but may be immediately and automatically reconstructed from the remaining file fragments with the error correction bits and the reference data. This may be especially relevant for files which must be highly available, e.g. files which are necessary for the working ability of a company. The fact that the distribution plan is generated for the file may enable a fine-grained generation of the distribution plan optimized for the respective file.

Furthermore, it enables the user to distribute data in an existing web application and to store it cryptographically secured, i.e. encrypted and fragmented. When running the web application, the user may upload files to storage services without having to call additional applications. This reduces the complexity of operation for the user and avoids errors that may potentially compromise the security of the user's personal data.

The user is allowed to upload files and to access and download them at a later point in time and at a different location if necessary. The files are not stored with the operator of the web application, nor are the stored files accessible by the respective operator or other third parties. Even the storage services, none of which comprise a complete file, are excluded from accessing the data. The sole authority to dispose of his data and in particular of who is allowed to view it therefore remains with the user.

This may also be an advantage for the provider of a web application. Since the files are not stored on the web server computer system of the web application provider and also not on any other storage system assigned to the respective provider, the web application provider does not have to provide the appropriate resources to realize its own storage, nor is it necessary for it to assume responsibility with regard to data protection when storing the user's respective files.

A distribution plan is used to fragment and distribute the file and provides information on where to find the individual file fragments for a particular file and how to reassemble these file fragments. The distribution plan is clearly identifiable and assigned to the corresponding file. The distribution plan is stored and provided in encrypted form according to embodiments. For example, the distribution plan is protected with a personal password or encrypted with a public cryptographic key of an asymmetric key pair. According to embodiments, the distribution plan may also be encrypted with a symmetric password. According to embodiments, the distribution plan may be encrypted with the same cryptographic key as the file or with a different cryptographic key.

The distribution plan that is for example identified by a link, that is, a storage address under which the distribution plan can be accessed, such as a URL, is linked to the file to be stored in the Web application. This may be done by generating reference data that comprises an identifier for the file and the corresponding link for the distribution plan. In this way, a user may be able to access the distribution plan of his or her file at a later point in time and, if necessary, at a different location, and reassemble the corresponding file locally in his or her Web browser to obtain the original file. For example, the distribution plan ensures that only storage services that meet predefined minimum security standards are used.

A Uniform Resource Locator (URL), which is a uniform resource pointer, is an identifier used to identify and locate resources in a network. The URL comprises information about an access method or protocol to be used, such as HTTP or FTP, and/or a location in the network where the resource is located.

A web application is referred to herein as an application program comprising machine-readable program instructions that are provided for invocation over a network, such as the Internet, by a computer system, i.e. a web server computer system. The provided program instructions are configured to be invoked by a web browser over the network and executed in the corresponding web browser. In addition, the web application running in the web browser may provide access to one or more services that the web server computer system provides over the network according to a client-server model. Such a client-server model defines a model for distributing services in a network. The tasks arising in the course of service execution are performed by programs or by computer systems running programs. A client computer system requests a service from a server computer system. In particular, the server computer system and the client computer system may be two separate, physically separate, and independent computer systems. In particular, the server computer system may be a stationary computer system. In particular, a client computer system may be a mobile, portable telecommunications device. In particular, the server computer system may be configured to simultaneously process and answer a plurality of requests from a plurality of client computer systems.

A server computer system is referred to as a computer system with at least one processor, a memory and a communication interface for communication over a network, wherein a server program with machine-readable program instructions is stored in the memory. A client computer system means a computer system having at least one processor, a memory and a communication interface for communication over the network, the memory storing a client program with machine-readable program instructions. When the processor of the client computer system executes the program instructions of the client program, the processor of the client computer system controls the client computer system so that a service request to request a service provided by a server computer system is sent to the corresponding server computer system over the network using the communication interface of the client computer system.

When the processor of the server computer system executes the program instructions of the server system is referred to as, it controls the server computer system so that a service request from a client computer system is received and processed over the network using the communication interface of the server computer system. In response to the request, a response is generated and sent to the requesting client computer system over the network using the communication interface of the server computer system. This implements communication between the server computer system and the client computer system, or between the server program and the client program, to enable the client computer system to access a service provided by the server computer system.

The processor of the server computer system executes the program instructions of the server program, while the processor of the client computer system executes the program instructions of the client program. Communication between the client computer system and the server computer system depends on the requested service, which determines which data is exchanged between the two computer systems. The server computer system is on standby to be able to respond at any time to the contact, i.e. a service request, of a client computer system. In contrast to the client computer system, which requests a service, the server computer system thus behaves passively and waits for corresponding service requests. The rules of communication for a service, that is, the format, calling the server computer system, the meaning of the data exchanged between the server computer system and the client computer system, and so on, are defined by a communication protocol specific to the service being provided.

A service is referred to as a group of one or more specified tasks that the server computer system offers to perform, and which may be used by one or more client computer systems.

According to embodiments, the web application enables, in addition to access to services of the web server computer system according to a client-server model, a local execution of program instructions and thus functionalities in the web browser on a user computer system. This may be particularly advantageous for cryptographically secure file storage. If cryptographic program instructions, such as encrypting or decrypting files, are executed locally on the user computer system, this may increase the security of the method. This is especially true if the cryptographic keys used for encryption or decryption do not leave the user computer system and are stored, for example, in a protected memory area of a memory of the user computer system.

Furthermore, corresponding cryptographic keys may be stored according to embodiments on an additional hardware token, e.g. in a protected memory area of a memory of the hardware token, whereby decryption (and possibly also encryption) takes place exclusively on the corresponding hardware token.

Web applications are not installed locally on the user's computer system but are executed on it. In addition, they may provide access to services that are not running on the user computer system but also on the web server computer system. Services are thus provided and executed centrally by the web server computer system as a terminal server. The user computer system starts the execution of the program instructions comprised by the service from the web server computer system rather than from a local memory such as a local hard disk. The results of the corresponding data processing during the execution of the service are sent from the web server computer system to the user local client computer system for display and/or output. For example, a web application provided by a web server computer system is used using a web browser running on the user client computer system. The web browser communicates with the web server computer system and displays the user interface. Communication is performed using communication protocols for communicating over the network, such as HTTP protocol or HTTPS protocol.

One advantage of web applications is, for example, the ability to install updates. Such updates only need to be installed once on the web server computer system and may then be used by the user computer system.

According to embodiments, the web browser emulates a client application with the corresponding functionality when the web application is executed.

The web application provides the program instructions in the form of software as a service. Software as a Service (SaaS) is a subarea of cloud computing, whereby software and IT infrastructure are operated by an external IT service provider and may be used by the user as a service. An Internet-capable computer and an internet connection to the external IT service provider are required for use. Access to the software is realized via a web browser.

According to embodiments, the web server computer system provides a service via the web application, whereby the file to be stored comprises data that is generated and/or used in the course of executing the service.

Embodiments may have the advantage that the secure storage of files can be integrated into an existing web application through which the web server computer system provides services, especially SaaS. This not only enables data processing by the corresponding services, but also complements secure storage of the data used and/or generated.

For example, any web application that provides the user with certain services is given. If the provider of the web application would like to offer the user an additional possibility to upload, download and manage files for secure storage, embodiments may enable the use of external storage providers without security problems or the provider of the web application having to provide own storage resources.

For secure storage of files, all that is required is the integration of appropriate modules for uploading and downloading files into the web application and the addressing of the communication interface regarding the authorization of the upload or download by the web server computer system. The administration of reference data, which for example identifies the distribution plans assigned to the individual files, takes place for example in an additional server module of the web server computer system and is completed by the reference list per user on the web server computer system side. For each user of the web application and their individual files, the reference list comprises a reference to a distribution plan for the respective file. The modules themselves, which perform the uploading and downloading of data, may not be bypassed. The references, which contain secrets for accessing the files, must be secured in the web application or on the web server computer system in such a way that only an authorized user may access them. By embodiment, the security of the concept is based on the secure management of the reference lists on the web server computer system side. For example, at least parts of the reference data are encrypted and/or may only be retrieved after successful authentication of a requesting user via an end-to-end encrypted data connection.

According to embodiments, providing the distribution plan comprises generating the distribution plan on the user computer system by the web application. Embodiments may have the advantage that the web application generates a suitable distribution plan based on the data to be stored, for example, its size.

According to embodiments, providing the distribution plan comprises receiving the distribution plan on the user computer system by the web application. Embodiments may have the advantage that an existing distribution plan or a distribution plan generated by the web server computer system or a file management server computer system can be used by the web application. For example, the distribution plan is generated by the file management server computer system in response to a request from the Web server computer system and sent to the web application via the web server computer system.

According to embodiments, the web application communicates directly with the file management server computer system, and the web application identifies itself to the file management server computer system as belonging to the web server computer system. For example, the file management server computer system recognizes only the web server computer system, which internally assigns the distribution plans to different users.

The method of according to embodiments further comprises sending the distribution plan from the web application over the network to a file management server computer system for storage. Embodiments may have the advantage that the storage and management of the distribution plans, as well as management of the authorization tokens, is provided by the file management server computer system, which the web server computer system uses to integrate the file placement function.

According to embodiments, the method further comprises an encryption of the distribution plan. Embodiments may have the advantage that the distribution plans can only be used by owners of a corresponding cryptographic key. For example, this cryptographic key may be a symmetric cryptographic key in the case of symmetric encryption or a private cryptographic key in the case of asymmetric encryption with a public cryptographic key.

According to embodiments, the authorization tokens are received by the web application on the user computer system from the file management server computer system, wherein the received authorization tokens comprise an authorization token from each of the multiple storage services identified in the distribution plan, which were requested by the file management server computer system on command of the web server computer system and forwarded to the user computer system.

Embodiments may have the advantage of enabling only one authorized user, who is a user authorized by the web server computer system, to store files.

According to embodiments, receiving the authorization token requires successful authentication of the web server computer system against the file management server computer system. Embodiments may have the advantage that the web server computer system acts as the instance responsible for storing the files, as opposed to the file management server computer system. Thus, the user must authenticate against the File Management Server computer system. In other words, the secure storage of files may be integrated in the web application without the user having to communicate with and/or authenticate against additional servers. In particular, there is no need to set up additional user accounts. According to embodiments, a one-time registration with the web server computer system is sufficient. In the course of saving files, the user only needs to authenticate himself/herself against the web server computer system, which is done according to embodiments, for example, when logging in to the invoking web application via the web browser.

According to embodiments, the web application sends the file fragments to the identified storage services, bypassing the web server computer system and/or the file management server computer system. Embodiments may have the advantage that neither the web server computer system nor the file management server computer system has access to all file fragments.

According to embodiments, the authorization tokens are customized as URLs, each of which enables direct read access to a storage location identified by the URL on one of the storage media of one of the storage services. Embodiments may have the advantage that simple access to the storage locations for uploading and/or downloading the file fragments is provided, which at the same time serves as proof of authorization for the corresponding access.

According to embodiments, the method further comprises the generation of reference data associated with the file, which are used to reconstruct the file from the file fragments stored in a distributed manner and are stored by the web server computer system. Embodiments may have the advantage that the reference data can be used to efficiently manage the distributedly stored files.

According to embodiments, the reference data comprises: an identifier of the user, an identifier of the file, an identifier of the distribution plan, an identifier of a cryptographic key for decrypting the encrypted file, an identifier of a cryptographic key for decrypting the encrypted distribution plan, a hash value of the complete file and/or hash values of the stored file fragments. Embodiments may have the advantage that the reference data can associate the distribution plan with the file and/or the user. In addition, the reference data may be used to verify the integrity of the file and/or file fragments using the hash values. Finally, the reference data may identify everything needed to reconstruct a file. According to embodiments, the identifiers also indicate the memory addresses at which the identified and required data objects may be found. The hash values used may, for example, be a hash value calculated using an MD5, Sha-1 or Sha-2 hash algorithm. For example, the file is encrypted with a symmetric key, such as a hash value of the file.

According to embodiments, the file fragment specific hash values may serve as identifiers of the file fragments. The hash values of the file fragments can be linked to a mapping with the original file name, and the mapping may be included in the reference data together with the original file name. The user computer system encrypts each of the file fragments of the file, using the hash value of the entire original file as a symmetric key. Preferably, strong encryption such as AES-256 or AES 512 is used.

According to embodiments, the reference data is stored by the web server computer system in cryptographically secure form. Embodiments may have the advantage of increasing the security of the method. For example, the reference data is stored in a protected area of the memory of the web server computer system. Furthermore, access, for example, is only granted under the condition of a successful authentication of a requesting party and/or the corresponding data is only transmitted via a data connection secured by end-to-end encryption.

According to embodiments, the web application communicates the reference data to a server module for managing reference data, which is executed by a processor of the web server computer system. Embodiments may have the advantage that the functionality of a given web server computer system can be extended by a corresponding server module to include this management of reference data.

According to embodiments, the reference data is stored by the web server computer system in a reference list with a plurality of reference data for a plurality of files of different users of the web application. Embodiments may have the advantage that the web server computer system can make the web application and/or its services available to a plurality of users, including secure storage of the files of all users.

The method of according to embodiments further comprises an authentication of the user against the web server computer system. Embodiments may have the advantage that it can be ensured that only one authorized user has access to the securely stored files.

According to embodiments, the web application includes one or more modules for distributed storage of the file on the storage services and encryption, fragmentation and transmission are performed by executing the modules of the web application in the web browser by a processor of the user computer system.

Embodiments may have the advantage that the corresponding modules are executed locally in the web browser on the client computer system. By integrating corresponding modules, any web applications may be enabled to enable cryptographically secure data storage. The entire functionality regarding the secure storage of files is based on the modules integrated into the web application. The corresponding functions of the web application are made available, for example, via a library.

Embodiments enable the secure storage of files to be integrated into an existing web application in the form of corresponding modules as micro services.

A microservice is a sub-process of a complex application that is composed or combined into several independent processes that communicate with each other using language-independent programming interfaces. The individual microservices or services are largely decoupled, and each perform a small subtask. The use of microservices thus enables a modular structure of the application.

For example, the web application comprises an encryption module for encrypting files, a fragmentation module for fragmenting files, and a transmission module for transferring or sending the file fragments. According to embodiments, the encryption module is further configured to decrypt files, the fragmentation module to defragment file fragments, and the transfer module to download file fragments.

For example, the Encryption Module, the Fragmentation Module, and the Transfer Module are combined into an Upload Module, which enables secure storage of files in encrypted and fragmented form on a distributed storage system with independent storage media.

According to embodiments, the method for downloading the cryptographically secured stored file using the web application executed by the web browser on the user computer system further comprises:
  invoking the web application from the web server computer system over the network by the web browser on the user computer system,
  providing the distribution plan of the distributedly stored file by the web application, wherein the distribution plan comprises instructions for defragmenting the file from a plurality of file fragments by means of an error correction method and identifiers of the plurality of mutually independent storage services in whose non-volatile storage media the file fragments are stored,
  providing by the web server computer system an authorization token of each of the storage services of at least a selection of the storage services in whose non-volatile storage media the file fragments are stored, wherein the file fragments included in the selection of the storage services are sufficient for a complete reconstruction of the file,
  downloading the file fragments from the individual storage services using the authorization tokens as proof of authorization for downloading,
  defragmenting the encrypted file from the file fragments on the user computer system by the web application using the error correction method in accordance with the distribution plan,
  decrypting the encrypted file with a cryptographic key on the user computer system by the web application.

A retrieval of the distributedly stored files is carried out via the web browser running on the user computer system. The file fragments are downloaded from the storage providers, defragmented and decrypted, resulting in the original file. Embodiments may have the advantage of enabling efficient and secure downloading of the distributedly stored file fragments.

According to embodiments, the web server computer system provides a service via the web application, and data contained in the downloaded file is used by the web application as the service runs. Embodiments may have the advantage that downloading a file or data necessary for the service or in the course of service execution can be integrated into the web application.

According to embodiments, providing the distribution plan comprises receiving the distribution plan from the file management server computer system on the user computer system via the web application. According to embodiments, the distribution plan is sent from the file management server computer system directly to the web application or forwarded from the web server computer system.

According to embodiments, the distribution plan is provided in encrypted form and the deployment further comprises decrypting the distribution plan on the user computer system by the web application. Embodiments may have the advantage that the distribution plan can be protected efficiently. For example, the cryptographic key for decrypting the distribution plan is stored locally on the user computer system or is provided locally to the user computer system by the user, such as using a hardware token, if necessary.

According to embodiments, providing the authorization tokens on the user computer system by the web application comprises receiving the authorization tokens from the file management server computer system, which were requested by the file management server computer system on command of the web server computer system and forwarded to the user computer system. Embodiments may have the advantage that only authorized users can access the distributedly stored file fragments. Furthermore, access is managed by the File Management Server computer system and must be enabled or initiated by the web server computer system.

According to embodiments, the receiving of the authorization tokens requires successful authentication of the web server computer system against the file management server computer system.

According to embodiments, the web application downloads the file fragments from the identified storage services, bypassing the web server computer system and/or the file management server computer system. Embodiments may have the advantage that neither the web server computer system nor the file management server computer system can gain access to all the data fragments necessary to reconstruct the file during downloading.

According to embodiments, the method further comprises receiving, from the web server computer system via the web application on the user computer system, reference data associated with the file to be downloaded, which is used to reconstruct the file from the distributedly stored file fragments. Embodiments may have the advantage that the reference data can be used to efficiently manage the downloading of the files.

According to embodiments, the file downloading requires the user to successfully authenticate himself against the web server computer system. Embodiments may have the advantage that only authorized users have access to the distributed file.

According to embodiments, one or more modules for distributed file storage on the storage services are integrated into the web application and downloading, defragmentation and decryption are performed by running the modules of the web application in the web browser by the processor of the user computer system. Embodiments may have the advantage that a given web application can be easily extended by the modules with the functionality of downloading required files. The entire functionality regarding secure file retrieval is based on the modules integrated into the web application. The corresponding functions of the web application are made available, for example, via a library. Embodiments thus enable the secure retrieval of files to be integrated into an existing web application in the form of corresponding modules as micro services.

For example, the web application comprises a transfer module for transferring or downloading the file fragments, a fragmentation module for defragmenting the file fragments, and an encryption module for decrypting the encrypted file. According to embodiments, the encryption module is also configured to encrypt files, the fragmentation module is configured to fragment files, and the transfer module is configured to upload file fragments.

For example, the encryption module, the fragmentation module, and the transfer module are combined into a download module that enables secure retrieval of files in encrypted and fragmented form from a distributed storage system with independent storage media.

According to embodiments, the reference data and/or the distribution plan are stored in encrypted form and the cryptographic keys for decrypting reference data and/or the distribution plan are provided by a hardware token, the method further comprises:

Sending, from the user computer system to the hardware token, a decryption request for access to the decrypted reference data and/or the decrypted distribution plan Authenticating the user computer system against the hardware token, After successful authentication of the user computer system and if the user to whom the user computer system is assigned has access rights to the decrypted reference data and/or the decrypted distribution plan, receiving the reference data and/or distribution plan decrypted by the hardware token with the cryptographic key, for example a private cryptographic key.

According to embodiments, the cryptographic keys for decrypting encrypted data objects, such as the reference data and/or the distribution plan, are stored on the user computer system or on a hardware token in a protected storage area.

A "protected memory area" is understood here as an area of an electronic memory to which access, i.e. read access or write access, is only possible via a processor of the user computer system or hardware token. According to embodiments, access from the processor coupled to the memory is only possible if a condition necessary for this is fulfilled. This may, for example, be a cryptographic condition, in particular a successful authentication and/or authorization check.

If cryptographic keys are stored on an independent, cryptographically secured hardware token, the security of this method may be additionally increased. For example, the hardware token is a privatized or personalized smart card comprising a processor and a memory, the private key being stored in a protected memory area of the memory. For example, as a prerequisite for using the private key, the user must authenticate himself against the hardware token. This may be by means of an ID, such as a password, a biometric feature or behavior-based. A biometric feature may be an acceleration pattern, heart rate, vein pattern, iris pattern, retina pattern, voice pattern and/or fingerprint.

In this context, the encrypted file and the user's private key, which is required to decrypt the file, are never stored on the same device. So even if an attacker manages to gain access to one of the devices, e.g. the user computer system or the hardware token, he does not have all the necessary prerequisites for decryption. A decryption of the reference data or at least of the symmetric key takes place exclusively in the hardware token, without the private key leaving the hardware token.

In addition, the necessary authentication of the user computer system against the hardware token introduces an additional test instance into the method, which further increases security.

For example, the user computer system sets up a secure communication channel, for example using end-to-end encryption, with the hardware token and transfers to it the reference data to be decrypted. The reference data is decrypted on the hardware token with the private key in a secure, i.e. cryptographically protected, environment. The decrypted reference data is then transferred to the user computer system using the secure communication channel.

By storing the user private key on the hardware token, the method for secure data storage in the cloud becomes even more secure, since only the owner of the hardware token may decrypt the file and thus have access to the corresponding data. The so-called scalability of attacks on the system or method is thus reduced, since the user private key is not protected by the user computer system, e.g. the operating system software.

According to embodiments, the file is encrypted with a symmetric key. According to embodiments, the reference data comprises the symmetric key. According to embodiments, the symmetric key is encrypted with a public cryptographic key of an asymmetric key pair assigned to the user.

According to embodiments, each of the file fragments of the encrypted file is additionally encrypted with a symmetric key. This symmetric key, with which the file fragments are additionally encrypted, may be the same symmetric key with which the file is encrypted or another symmetric key. For example, an individual key is generated for each of the file fragments. For example, the generated symmetric keys may be randomly generated keys, or the keys may each contain a password, such as a hash value, of the file fragment to be encrypted with the key. The symmetric key(s) with which the file fragments are additionally encrypted are also comprised by the reference data which are encrypted with the user public key. The additional encryption of the file fragments may further increase the security of the method.

According to embodiments, the user computer system is assigned to a user. The web server computer system performs an authorization check and initiates a request for the authorization tokens from each of the storage services identified in the distribution plan only if the authorization check determines that the user is authorized to read/write the file.

The check of the access rights is preferably only carried out in relation to the requested read and/or write operation regarding the file to be written or read. This has the advantage that the access control may be very fine-grained regarding individual users, regarding time, and regarding individual files in a flexible and specific way.

According to embodiments, the asymmetric key pair assigned to the user is generated by an issuing instance, e.g. on a cryptographically secured system, while personalizing the hardware token, and is thereby uniquely assigned to the user. For example, the asymmetric key pair is stored on the hardware token during its production. The assignment to the user may be implemented, for example, by means of a certificate issued by the issuing instance as the certification authority of the PKI or an independent root certification authority, which comprises the public key.

The assignment to the user may additionally or alternatively include that the associated public key is transferred, for example from the user computer system, to the file management server computer system and stored there as part of the user profile of the corresponding user.

According to embodiments, the file fragments are downloaded by the user computer system in parallel over the network from the storage services. This may increase the download speed of the file.

"End-to-end encryption" is understood herein as an encryption of a connection between a sender and a receiver, in which data to be transmitted is encrypted by the sender and only decrypted again by the receiver. The encryption of transmitted data is thus carried out across all transmission stations, so that intermediate stations may not gain knowledge of the content of the transmitted data due to the encryption. The connection is cryptographically secured by the encryption in order to prevent spying and/or manipulation of the transmission, wherein a so-called secure messaging method may be used for this purpose. End-to-end encryption is based, for example, on two symmetric cryptographic keys, wherein a first of the symmetric keys is used to encrypt messages and a second of the symmetric keys is used to authenticate the sender of the message.

The key used to authenticate the sender of the message may be used, for example, to generate a Message Authentication Code (MAC). A MAC can be used to obtain certainty about the origin of messages and verify their integrity. MAC algorithms require two input parameters, first the data to be protected and second a secret key. A message authentication code in the form of a checksum is calculated from these two. The sender of a message calculates a MAC for the message data to be transmitted and sends the message to the recipient together with the MAC. The receiver calculates the MAC for the received message with his key and compares the calculated MAC with the received MAC. If both values match, it follows that the message was sent by a party that has access to the secret key and the message was not modified during transmission.

According to embodiments, the web server computer system manages public keys of a plurality of users. If another user of the plurality of users is also to be allowed access to the distributedly stored data, the method further comprises:
  providing the public key of the other user, whom the access should be allowed, by the web application,
  encrypting the reference data of the file by the web application on the user computer system,
  the web application sending the encrypted reference data to the web server computer system,
  forwarding the encrypted reference data through the web server computer system to the web application executed by a web browser of a user computer system of the other user.

Embodiments may have the advantage that different users can be granted access to the distributedly stored file. This may be advantageous because the web server computer system can centrally manage the public keys of a number of users and by forwarding both the reference data and the public keys selectively to authorized additional users, it can ensure a particularly high level of protection against unauthorized access. The symmetric key ensures that the file is fragmented in encrypted form and stored in the storage media of the individual storage services, and that the upload and download of the file fragments thus only comprises encrypted data. Preferably, a different symmetric key is dynamically generated for each individual file. The described combination of a file-specific symmetric key for encrypting and decrypting the file and a public key assigned to the user for integrating the symmetric key into the reference data of the file may also be advantageous, since the encryption or decryption of large amounts of data using symmetric cryptographic keys is usually much more performant than using an asymmetric cryptographic key pair. The speed aspect is less relevant for the encryption of the (comparatively small) reference data, so that here an encryption with an asymmetric cryptographic key pair may be used, which enables the exchange of a key necessary for decryption without disclosing the private key. Instead, the private key is stored locally and protected against unauthorized access.

If several users are authorized to access the file stored in a distributed manner, a separate version of reference data for the one file stored in a distributed manner may be generated for each of these authorized users according to embodiments, whereby the reference data is encrypted by the user computer system which originally stored the file in a distributed manner according to the distribution plan, using the public key (encryption key) of the respective user.

According to embodiments, the authorization tokens are selectively generated only for the access request to download the file fragments and are only temporarily valid.

Embodiments may have the advantage that the file management server computer system does not act as a router, which can help protect the data from unauthorized access by the file management server computer system. The fact that the authorization tokens are only temporarily valid may also increase the security of the method. After a predefined time, for example a few seconds, minutes or days, the authorization token, for example a URL, automatically becomes invalid. The use of authorization URLs also has the advantage that users who have not registered with the individual storage services may also be granted access to the file, since the web server computer system manages access rights centrally. The owner of the file may specifically define whether the access rights are read-only and/or write-only. This may increase the flexibility and number of application scenarios of the method enormously, since further users only need to register with the web server computer system to be able to view a file, for example. According to some embodiments not even this is required. For example, an additional user, who is not registered with the web server computer system, may be able to prove his identity to the web server computer system by means of his electronic identity card. However, embodiments where the key used to encrypt the file is encrypted with the public key of an authorized user computer system may require registration for centralized storage of the public encryption key of the user computer system.

For example, each URL may consist of a path and other information. For example, the path may include an ID of the storage service and a path to the corresponding storage space on the storage medium of the storage service. The further information may comprise, for example, parameter values indicating the user authorization to access said storage space and which are checked by the storage service when the user computer system accesses the file fragment via said URL.

According to embodiments, a signing key is stored in a protected area of the memory of the file management server computer system. The method further comprises:
 providing a signature verification key associated with the signing key to each of the storage services, wherein the signature verification key is adapted to verify signatures generated with the signing key,
 signing the authorization tokens with the signing key by the file management server computer system, wherein the authorization tokens are forwarded to the user computer system in signed form,
 wherein each of the signed authorization tokens enables access to the storage space identified by the respective authorization token on the storage medium of the respective storage service, provided that the storage service recognizes the signature as valid.

Embodiments may have the advantage of enabling individual storage services to perform signature verification to enhance the security of the data they store. According to embodiments, the signing of authorization tokens is performed both for authorization tokens that enable read access to a file that has already been stored in a distributed manner and for authorization tokens that grant write access to the distributed storage of a file.

According to embodiments, a minimum level of trust is defined, which specifies a minimum level of reliability for the authentication procedure by means of which the user computer system of the user must authenticate itself against the web server computer system in order to access the file stored in the storage media of the identified storage services.

The method further comprises checking by the web server computer system whether the authentication method used to authenticate the user computer system to the web server computer system is sufficiently reliable to meet the minimum level of trust established for the user for the requested access. The request for the authorization token is initiated by the web server computer system only if the authentication method used to authenticate the user computer system to the web server computer system has a level of confidence at least as high as the specified minimum level of confidence.

The minimum trust level may be configured and changed by the user. The minimum level of trust specifies a minimum level of confidence, defined by the user, of an authentication method by means of which another user must authenticate himself to a web server computer system in order to have read and/or write access to the file stored in the storage media of the identified storage services. This may be advantageous because it gives the user a configurable and fine-grained (at file level) control over access to that file by other users. The user may, for example, exclude the possibility that a file containing particularly confidential and sensitive information can be viewed by a user who has authenticated himself to the web server computer system only with a comparatively easy to crack authentication method (e.g. user name and password).

The method of according to embodiments further comprises:
 determining the expected total size of all file fragments to be generated by the error correction method according to the distribution plan, wherein a storage service is identified for each of the file fragments to be generated,
 if the determined error correction method would cause the generation of file fragments whose total size does not enable the identification of a sufficient number of storage services which, according to their specifications, meet the requirements of speed and/or security taking into account the total size, automatically determining an alternative error correction method configured to generate file fragments whose expected total size is sufficiently small.

A "word" of the error correction method is a group of bits representing the smallest unit in relation to which an error is detected and corrected if necessary. Often 8 bits are used as word length. A bit word length results in a fixed amount of data which may be corrected.

The determination of the error correction method to be specified in the distribution plan may include a determination of configuration parameters of the error correction method. The configuration parameters may include e.g.: a word length W, a number K of file partitions without considering the error correction bits, and/or a number M of file partitions K whose loss is to be compensated by the information content of the error correction bits if necessary. A "file partition" here is an initially generated file fragment which does not yet contain any error correction bits. From these initially generated file partitions the actual file fragments with the error correction bits may be calculated which are finally transferred to the storage services.

For example, the file size of the file to be stored may be considered when determining the error correction method. The file to be stored may have a file size of "10 Mb".

According to a first example, the number of file partitions K could be "4". This means that the error correction method first divides the file to be saved into 4 file partitions of 2.5 Mb size. The number M of file partitions whose loss should be compensated for, if necessary, may be "1". The configuration parameters K=4 and M=1 cause the error correction method to generate a total of 5 file fragments, each of which is 10 Mb/4=2.5 Mb in size. In total, an error correction algorithm with the exemplary K=4, M=1 configuration would generate 12.5 Mb of data from the original 10 Mb source file. Four of the file fragments may consist of the file partitions and thus be pure file data while the fifth file fragment may consist entirely of error correction bits. According to a second example, the configuration parameters K=4 and M=2 may cause the error correction method to generate a total of 6 file fragments, 2 of which consist of error correction bits, 4 of which consist of file partitions. A total of 6*2.5 Mb=15 Mb data is generated from the output file.

Besides error correction methods which generate file fragments consisting of either file partitions or error correction data only, other embodiments may also use error correction methods in which each generated file fragment contains a first part consisting of file data only and a second part consisting of error correction bits. In the above mentioned first example with K=4 and M=1 for a 10 Mb file, 5 file fragments of 2.5 Mb each may be generated which contain 2.5 MB/5=0.5 Mb error correction bits per file fragment. In the second example above with K=4 and M=2 for the 10 MB file, 6 file fragments of 2.5 Mb each containing (2*2.5 Mb)/6=0.83 Mb error correction bits may be generated.

According to some embodiments, the configuration parameters K and M are preconfigured by default for the web server computer system, but they may be changed dynamically depending on file characteristics to optimize the distribution of file fragments. The dynamic configuration parameters are integrated into the generated distribution plan to further characterize the error correction method identified therein. With increasing number M of the loss-compensable file partitions, the availability and reliability of the distributedly stored file is increased, but with unchanged K, the size of the individual file fragments also increases.

According to some embodiments, the configuration parameters M and/or K of the error correction method specified in the distribution plan are determined in such a way that with increasing user demands on the availability of the file, not only M increases, but also K. As a consequence, the number of file fragments to be generated by the error correction method is also increased in order to keep the size of the individual file fragments approximately constant and to ensure a consistently short transmission time with parallel file fragment upload. In this case, the number of storage services used for parallel storage of the file fragments and specified in the distribution plan may also have to be increased.

Embodiments also comprise a user computer system. The user computer system comprises a processor, a network interface for operatively coupling the user computer system to a web server computer system, and a plurality of storage services over the network. The user computer system further comprises a storage medium having a web browser executable by the processor. The web browser is configured to perform the following method for cryptographically secure storing a file using a web application executed by the web browser:

invoking the web application from a web server computer system over a network by the web browser on the user computer system, encrypting the file with a cryptographic key on the user computer system using the web application, providing a distribution plan by the web application, wherein the distribution plan comprises instructions for fragmenting the file into a plurality of file fragments by means of an error correction method and identifiers of a plurality of storage services in whose non-volatile storage media the generated file fragments are to be stored, fragmenting the encrypted file on the user computer system by the web application into a plurality of file fragments by the error correction method according to the distribution plan, wherein at least one of the file fragments includes error correction bits, sending the resulting file fragments by the web application over the network to the storage services identified by the distribution plan, wherein an authorization token is provided by the web server computer system for each of the storage services as proof of authorization to store the corresponding file fragment.

The user computer system is configured to execute one or more of the preceding embodiments of the method.

Embodiments further comprise a web server computer system. The web server computer system comprises a processor and a network interface for operatively coupling the web server computer system to a user computer system. The web server computer system further comprises a storage medium containing program instructions. The program instructions are configured, when executed by the processor, to send program instructions for executing the web application in a web browser on the user computer system to the user computer system over the network in response to receiving an invocation of a web application from a web browser on the user computer system over the network. The web application is configured to perform the following method for cryptographically secure storing a file:

encrypting the file with a cryptographic key on the user computer system using the web application, providing a distribution plan by the web application, the distribution plan comprising instructions for fragmenting the file into a plurality of file fragments by means of an error correction method and identifiers of a plurality of storage services in whose non-volatile storage media the generated file fragments are to be stored, fragmenting the encrypted file on the user computer system by the web application into a plurality of file fragments by the error correction method according to the distribution plan, wherein at least one of the file fragments includes error correction bits, sending the resulting file fragments by the web application over the network to the storage services identified by the distribution plan, wherein an authorization token is provided by the web server computer system for each of the storage services as proof of authorization to store the corresponding file fragment.

The web server computer system is configured to perform one or more of the preceding embodiments of the method.

According to embodiments, the web server computer system is further configured to provide a service via the web application, wherein the file to be stored is generated in the course of execution of the service by the web application.

Embodiments further comprise a file management server computer system. The file management server computer system comprises a processor and a network interface for operatively coupling the file management server computer system to at least one web server computer system, to at least one user computer system and to a plurality of storage services over the network. The file management server computer system comprises a storage medium containing program instructions. The program instructions are configured, when executed by the processor, to perform the following method for cryptographically secure storing a file:

- receiving an authorization request from the web server computer system to store file fragments of the file over the network in the plurality of storage services according to a distribution plan, wherein the file management server computer system does not provide any of the storage services,
- in response to receiving the authorization request, requesting an authorization token from each of the multiple storage services and forwarding the authorization tokens received in response to the request to the user computer system,
- storing the distribution plan, the distribution plan comprising instructions for defragmenting the file from a plurality of file fragments by means of an error correction method and identifiers of the plurality of storage services in whose non-volatile storage media the file fragments are stored.

The file management server computer system is configured to execute one or more of the preceding embodiments of the method.

A "distribution plan" in the sense of the present invention is a specification containing at least information about the identity of those storage services by which fragments of a file are to be stored and information defining an error correction method to be used for generating these file fragments from said file. A distribution plan may be adapted e.g. as an XML file or binary file.

A "file management server" or "file management server computer system" is a computer system having an interface for communicating with one or more user computer systems and for communicating with multiple storage services to provide the one or more user computer systems with access rights to storage media managed by these storage services. The file management server computer system does not itself provide any storage service and is preferably also separated from the storage services by security measures which ensure that none of these storage services has access to data managed by the file management server computer system, in particular, for example, user profiles and reference data. The file management server computer system may consist of one data processing device or of several data processing devices, in particular computers, which cooperate and are jointly managed to provide the functionality of the file management server computer system according to the embodiments described above.

An "authorization token" is a data structure, e.g. a file or a URL, which contains information that grants an instance in possession of that authorization token an authorization to access storage areas of external storage media. The external storage media may be provided, for example, by a storage service over the network such as the Internet. According to embodiments, the authorization token may contain both a pointer and an authorization credential. For example, the pointer may consist of a combination of an IP address of a storage service and a file path of a storage medium managed by that storage service. The credential may contain one or more data values that identify the owner of the credential token as authorized to access the storage medium, e.g. a random value generated by the storage service that can be compared to a reference value. Said data values may also comprise a signature.

A "storage service" is a service provided over the network that enables one or more user computer systems to send data over the network to the service for storage by the storage service on one or more storage media managed by the storage service and/or enables the user computer systems to access data already stored by this or another user computer system over the network, e.g. read or write. An individual storage service is preferably technically and organizationally separate from any other storage service. According to embodiments, each of the storage services is configured to receive data from the user computer system over the network via an interface and to store them in its non-volatile storage medium.

In the following, a "user computer system" is understood as a data processing system, e.g. a desktop PC, a notebook or a smartphone, which is assigned to a user.

A "hardware token" is a portable electronic device comprising a processor for executing program instructions and a memory for storing program instructions. For example, a hardware token is a telecommunications device such as a smartphone. The hardware token may also be an ID token. The term "ID token" means a device, such as a portable electronic device, for example a so-called USB stick, a smart card, or a document.

A "document" is understood as in particular an identity, value or security document, in particular a sovereign document, in particular a paper-based and/or plastic-based document, such as an electronic identification document, in particular a passport, identity card, visa, driving license, vehicle registration document, vehicle registration document, health card, or a company identification card, or another ID document, a chip card, means of payment, in particular bank note, bank card or credit card, consignment note or other proof of entitlement. In particular, the ID token may be a machine-readable travel document, such as standardized by the International Civil Aviation Organization (ICAO) and/or the BSI.

According to embodiments the ID-Token does not have its own power supply. Rather, an energy harvesting device, such as an RFID antenna, may be used as the energy source, which is transmitted from the terminal to the ID token.

A "certificate" here is a digital certificate, also known as a public key certificate. With such certificates based on asymmetric key pairs, a so-called Public Key Infrastructure (PKI) is realized. Such a certificate is structured data that serves to assign a public key of an asymmetric cryptosystem to an identity, such as a person or a device. For example, a certificate may contain a public key and be signed. Alternatively, certificates based on zero-knowledge cryptosystems are also possible. For example, the certificate may comply with the X.509 standard or another standard. For example, the certificate can be a CV certificate or a Card Verifiable Certificate (CVC). An implementation of such CVCs is specified in ISO/IEC 7816-8, for example.

The PKI provides a system for issuing, distributing and checking digital certificates. In an asymmetric cryptosystem, a digital certificate is used to confirm the authenticity of a public key and its permissible application and scope. The digital certificate itself is protected by a digital signature, the authenticity of which may be verified with the public key of the issuer of the certificate. A digital certificate is used to check the authenticity of the issuer key. In this way, a chain of digital certificates can be created, each of which confirms the authenticity of the public key with which the previous certificate may be checked. Such a chain of certificates forms a so-called validation path or certification path. PKI participants may rely on the authenticity of the last certificate, the so-called root certificate, and the key certified by this certificate without the need for another certificate. The root certificate is administered by a root certification authority. The authenticity of all certificates in the PKI is based on the authenticity that is assumed to be secured.

Digital certificates are a proven means of proving authorizations when securing electronic communication using asymmetrical cryptographic methods. Certificates are structured data that document the authenticity and/or other properties/authorisations of the owner of a public key (signature verification key) and confirm these by an independent, credible authority (certification service provider/CDP), generally the certification authority issuing the certificate. Certificates are usually made available to a wide circle of people to enable them to check electronic signatures for authenticity and validity.

A certificate may be associated with an electronic signature if the private key belonging to the public key was used to generate the electronic signature to be verified. By making a certificate available to the public in association with a public key, a CSP enables users of asymmetric cryptosystems to assign the public key to an identity, for example to a person, an organisation, an energy or computer system.

Asymmetric key pairs are used for a variety of cryptosystems and also play an important role in the signature of electronic documents. An asymmetric key pair consists of a public key, which is used to encrypt and/or decrypt data and may be passed on to third parties, for example to a service provider and/or a CSP, and a private key, which is used to encrypt and/or decrypt data and usually has to be kept secret. The public key enables anyone to encrypt data for the owner of the private key, to verify digital signatures of his documents or to authenticate him. A private key enables its owner to decrypt data encrypted with the public key or to generate digital signatures for electronic documents. A signature generated with a private key may be verified with the corresponding public key.

Digital signatures are used for secure electronic data exchange, for example in the Internet, and enable the verification of identities and/or authorizations and the authenticity of the exchanged data. To guarantee this, a public key infrastructure is usually required, which confirms the validity of the keys used by means of certificates.

The generation of a digital signature, also referred to as a "signature" in the following, is a cryptographic method in which a further data value, which is referred to as a "signature", is calculated for any data, for example an electronic document. The signature may, for example, be an encrypted hash value of the electronic document, in particular a hash value which is encrypted with a private key of a cryptographic key pair which is assigned to a certificate. The special feature of such a signature is that its authorship and affiliation to a determined person or instance may be verified by any third party.

A "memory" or "storage medium" is understood here as both volatile and non-volatile electronic memories or digital storage media.

A "non-volatile memory" is understood here as an electronic memory for the permanent storage of data. A non-volatile memory may be configured as a non-alterable memory, also known as read-only memory (ROM), or as an alterable memory, also known as non-volatile memory (NVM). In particular, it may be an EEPROM, for example a Flash EEPROM, also known as Flash. A non-volatile memory is characterised by the fact that the data stored on it is retained even after the power supply is switched off.

A "volatile electronic memory" is a memory for temporary storage of data, which is indicated by the fact that all data is lost after the power supply is switched off. In particular, this may be a volatile direct access memory, also known as random access memory (RAM), or a volatile working memory of the processor.

A "protected memory area" is understood here to be an area of an electronic memory to which access, i.e. read access or write access, is only possible via a processor coupled to the memory. According to embodiments, access from the processor coupled with the memory is only possible if a condition necessary for this is fulfilled. This may, for example, be a cryptographic condition, in particular successful authentication and/or a successful authorization check.

A "processor" here and in the following is understood to be a logic circuit that serves to execute program instructions. The logic circuit may be implemented on one or more discrete devices, in particular on a chip. In particular, a "processor" is understood to be a microprocessor or a microprocessor system comprising several processor cores and/or several microprocessors.

A "computer" or "computer system" may, for example, be a personal computer (PC) or laptop. The computer may comprise an interface for connection to the network, wherein the network may be a private or public network, in particular the Internet, a power supply network or other communication network. Depending on the embodiment, this connection may also be made via a mobile phone network.

An "interface" or "communication interface" is understood here as an interface via which data can be received and transmitted, wherein the communication interface may be configured as contact or contactless. The communication interface may be an internal interface or an external interface which is connected to an assigned device, for example, by means of a cable or wirelessly.

A communication interface for wireless communication is a communication interface that is configured for contactless transmission and reception of data. The communication may, for example, be based on an RFID and/or NFC standard, such as Bluetooth. Furthermore, the communication interface may be configured for communication via a local radio network, for example, according to a standard of the IEEE 802.11 family and/or Wi-Fi.

A "network" is understood herein as any transmission medium with a connection for communication, in particular a local connection or a local network, in particular a PAN (Personal Area Network), LAN (Local Area Network), a private network, in particular an Intranet, and a Virtual Private Network (VPN). A network may be fully or partially configured as a cellular network or a mobile network. For example, a computer system or mobile radio device may have a mobile radio interface for connecting to the mobile radio network. It may also be a public network, such as a MAN (Metropolitan Area Network), WAN (Wide Area Network), GAN (Global Area Network), or the Internet. Depending on the embodiment, this connection may also be established via a mobile telephone network.

A "program" or "program instructions" is understood herein without limitation as any type of computer program comprising machine-readable instructions for controlling a functionality of the computer.

A "web browser" is understood herein as a computer program for retrieving and displaying documents and data over the network, in particular for retrieving and displaying web pages on the World Wide Web. For example, any hyperlinks, especially as a connection between web pages, may be called up with the aid of a web browser. In addition to HTML pages, Web browsers may display various other types of documents, such as image, video or text files. In particular, a Web browser is configured to provide a user interface for Web applications.

In the following, a "trust level" is understood as a set of one or more parameter values that indicate a degree of trustworthiness with respect to whether a user who has authenticated himself to the file management server computer system with a user computer system assigned to him is actually the person he claims to be by providing his authentication data.

An "error correction bit" or "parity bit" is a bit which is generated in addition to one or more bits of the actual user data and, if necessary, transmitted to a receiver, and which serves to check the integrity of said one or more bits of user data during transmission to the receiver.

An "error correction method" is a method which serves to detect and correct errors in the storage and transmission of data, wherein an error may also consist of parts of a logically related set of data (e.g. a file) being temporarily or permanently unavailable, e.g. due to failure of a storage medium which had stored these parts. To achieve this, error correction procedures add redundancy to the user data before storing or transmitting user data by means of additional error correction bits which may be used to determine errors and error positions and to reconstruct missing parts of the user data.

Figure 2:
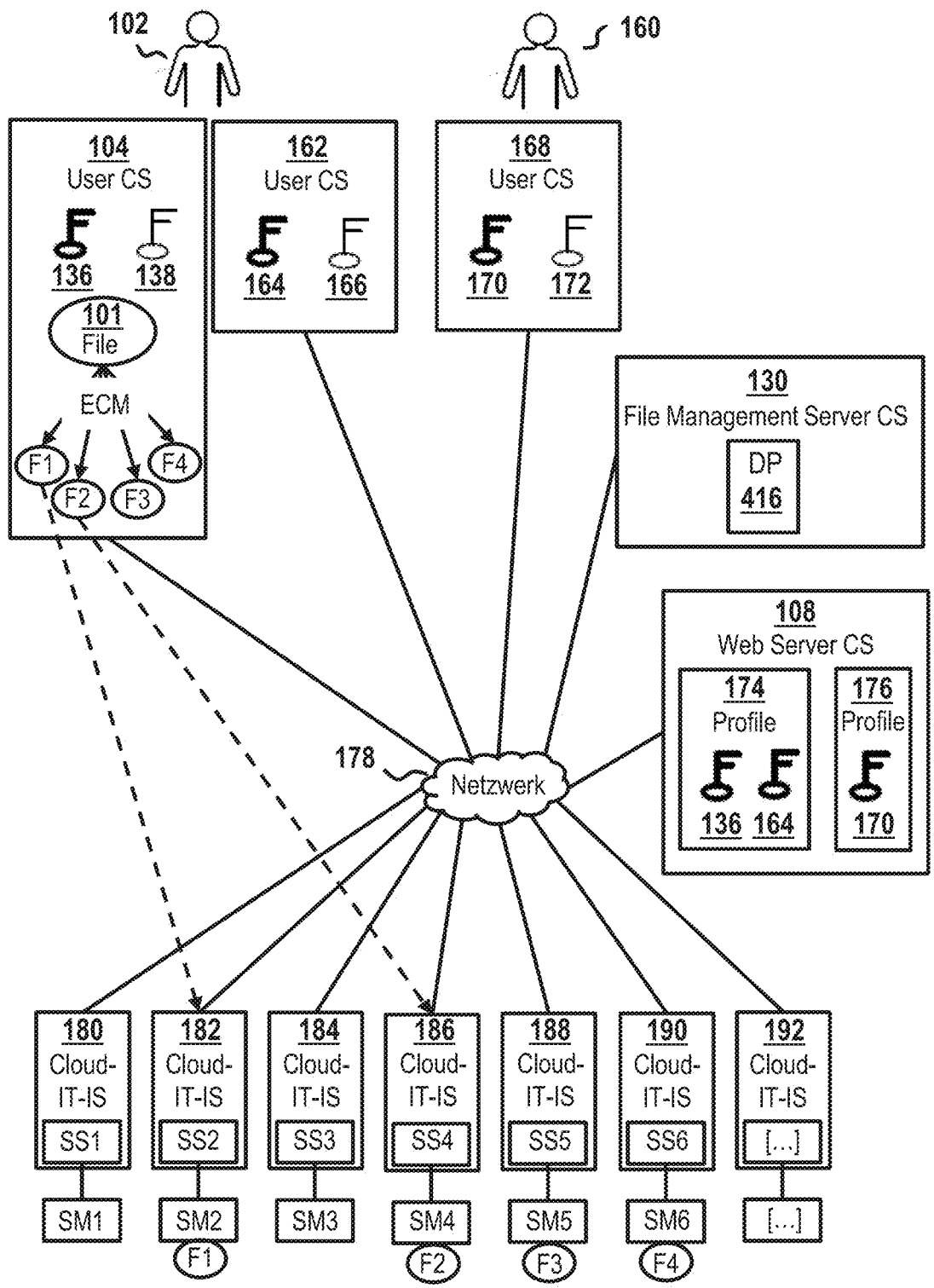
Figure 3:
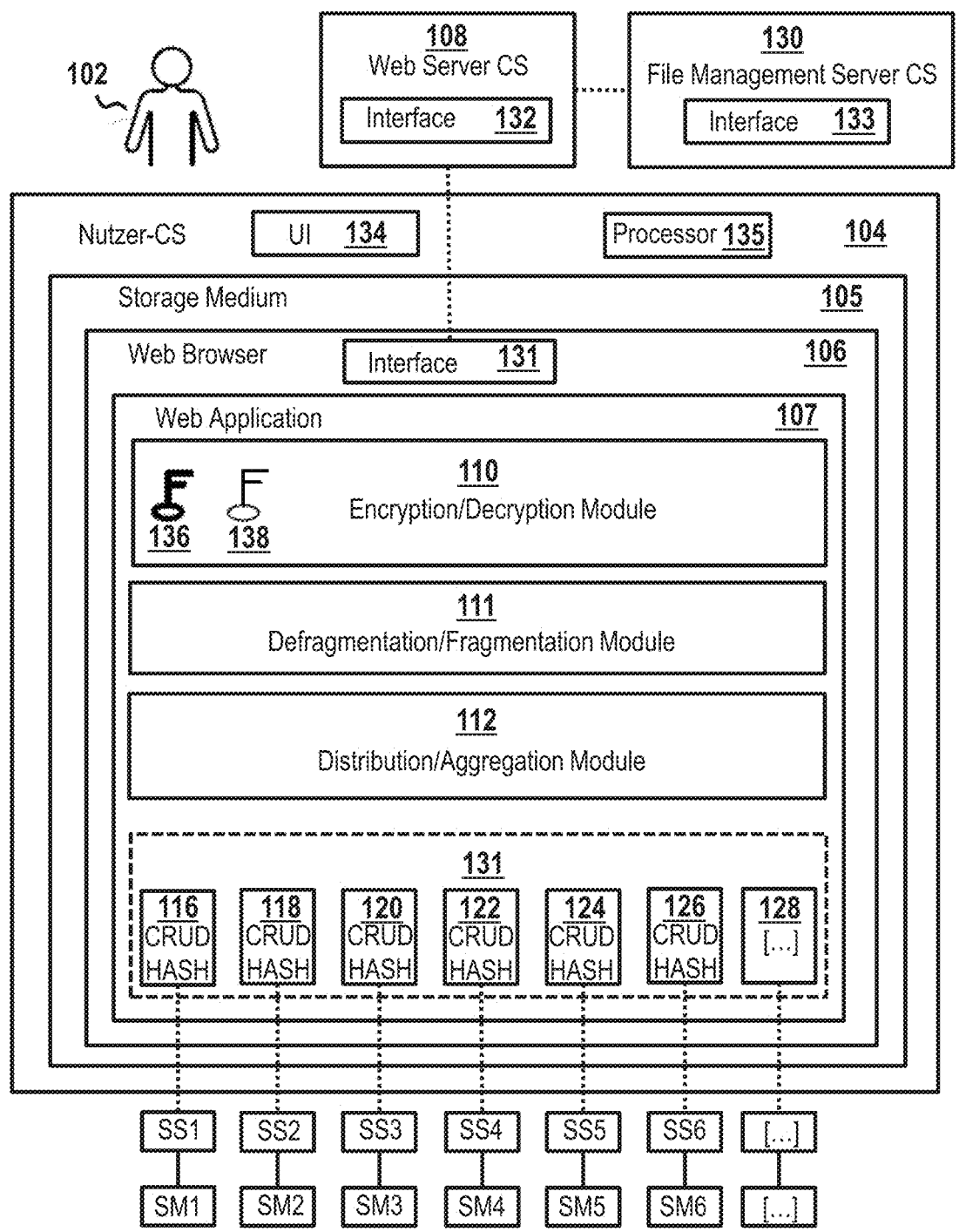
Figure 4:
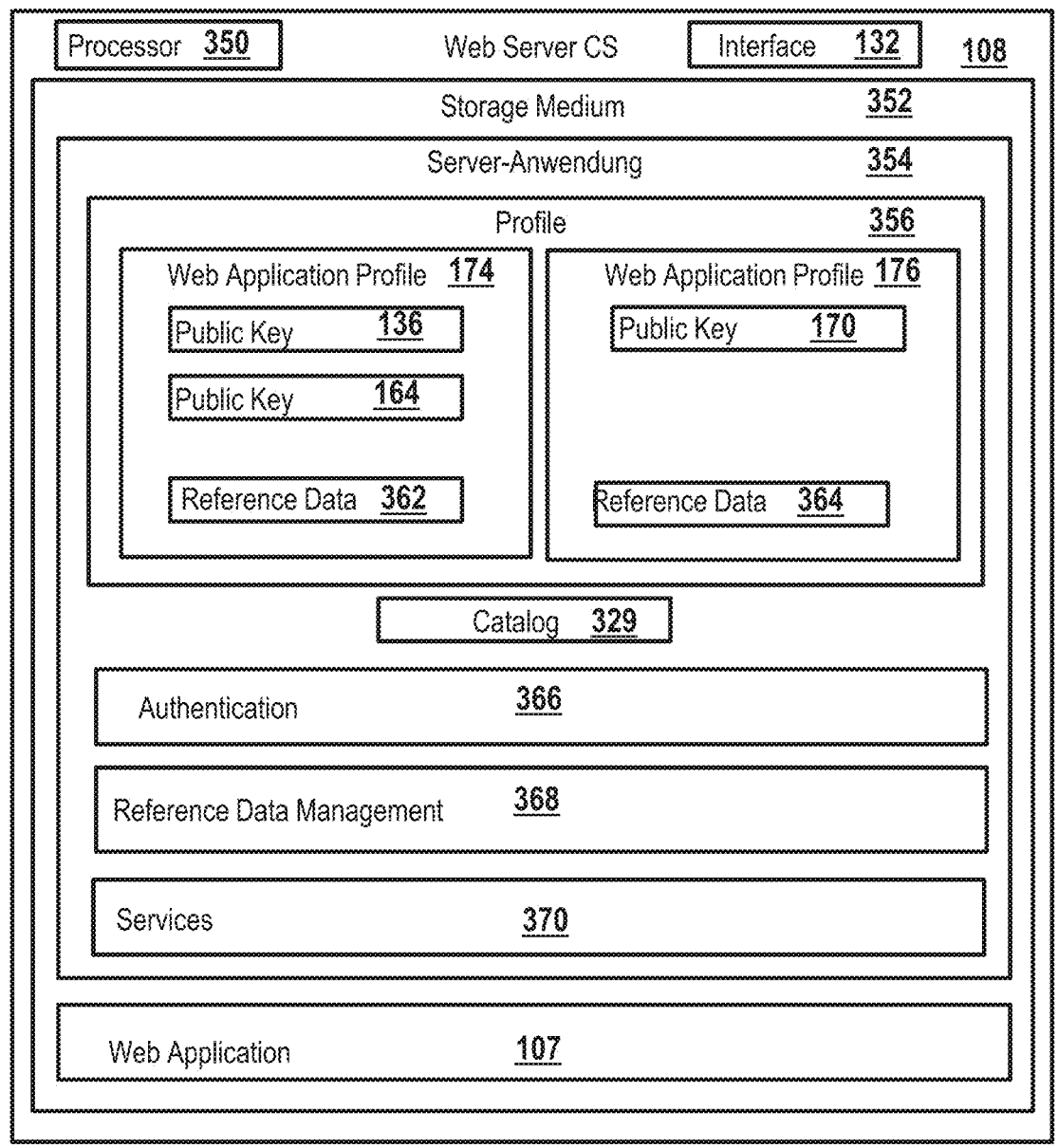
Figure 5:
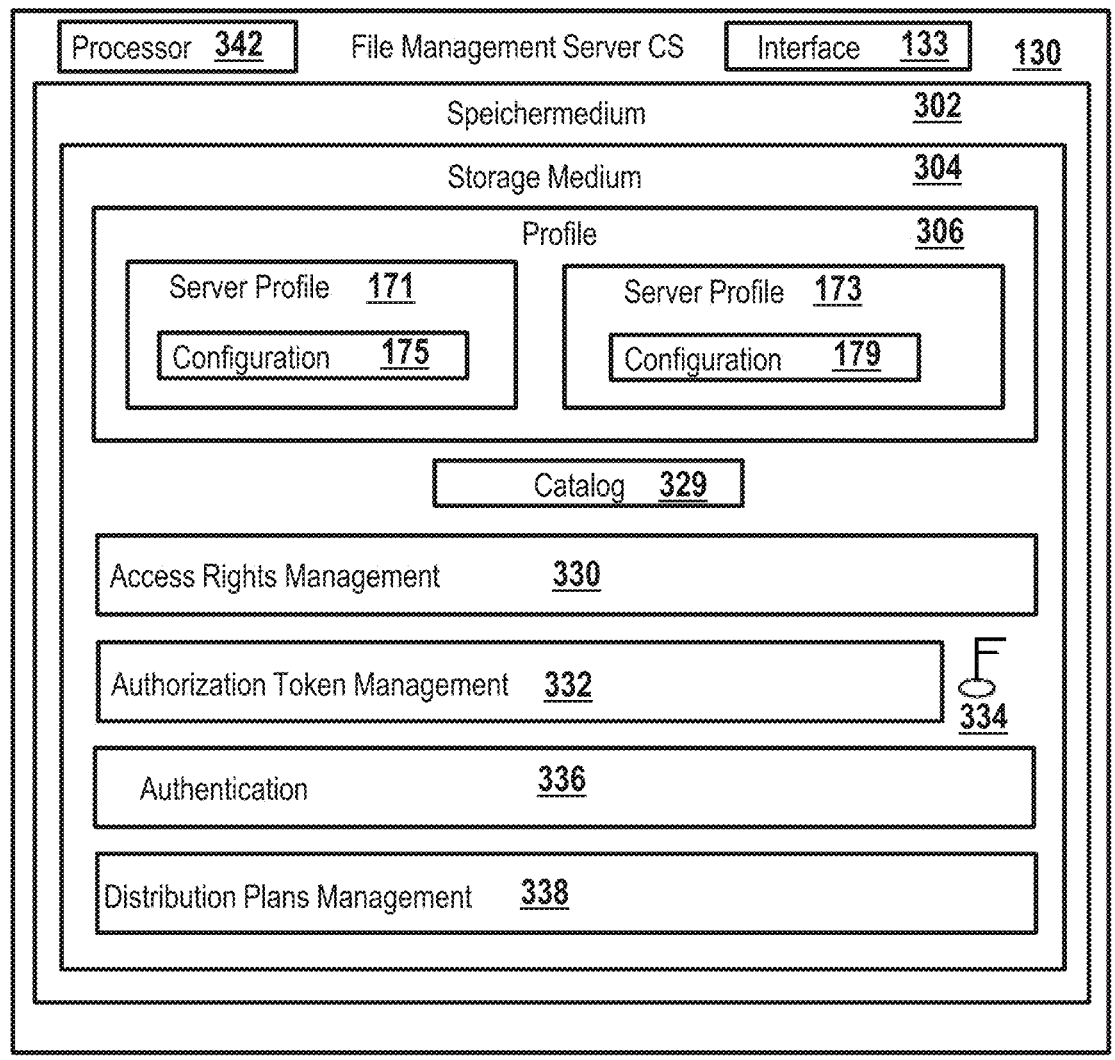
Figure 7A:
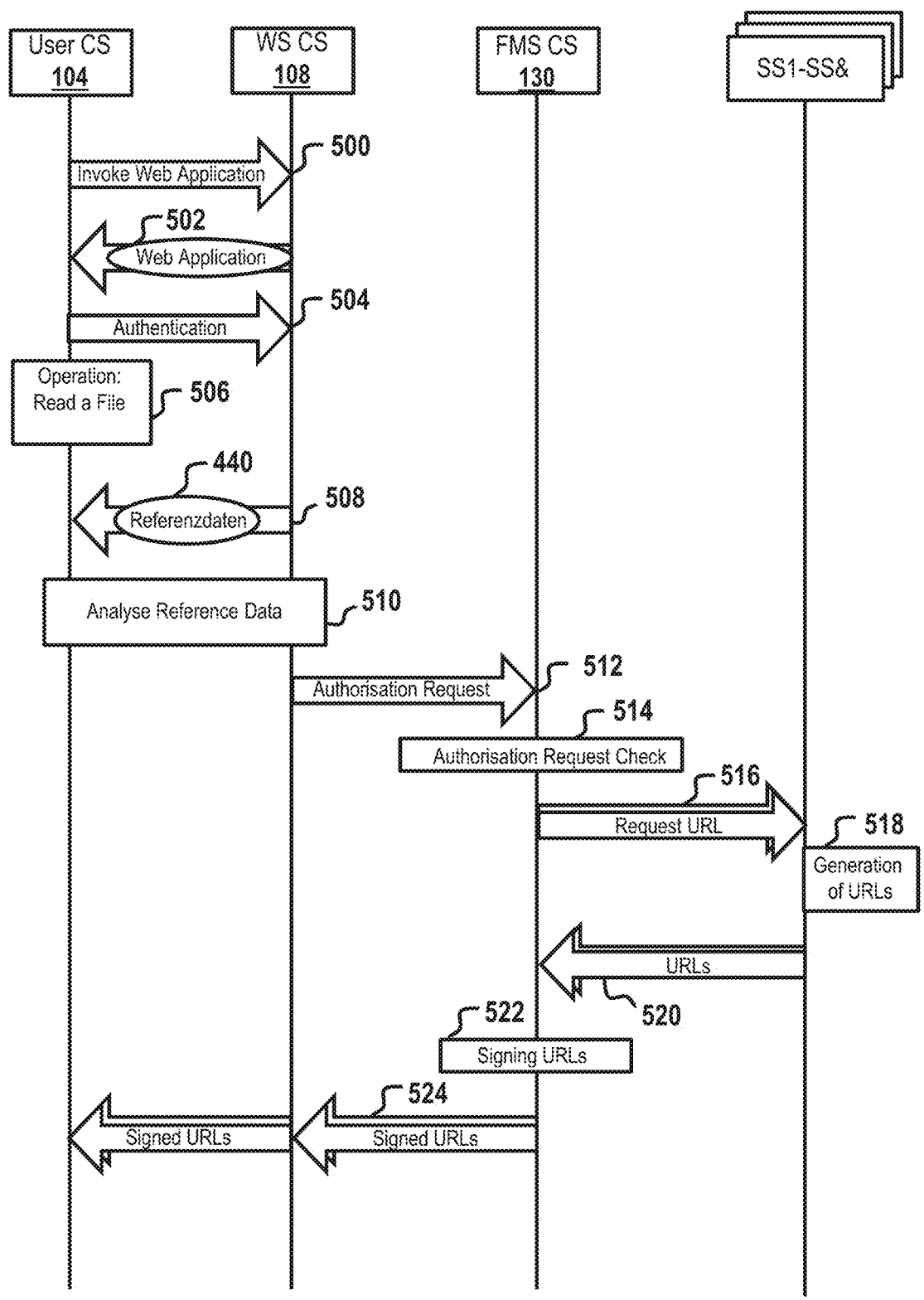
Figure 7B:
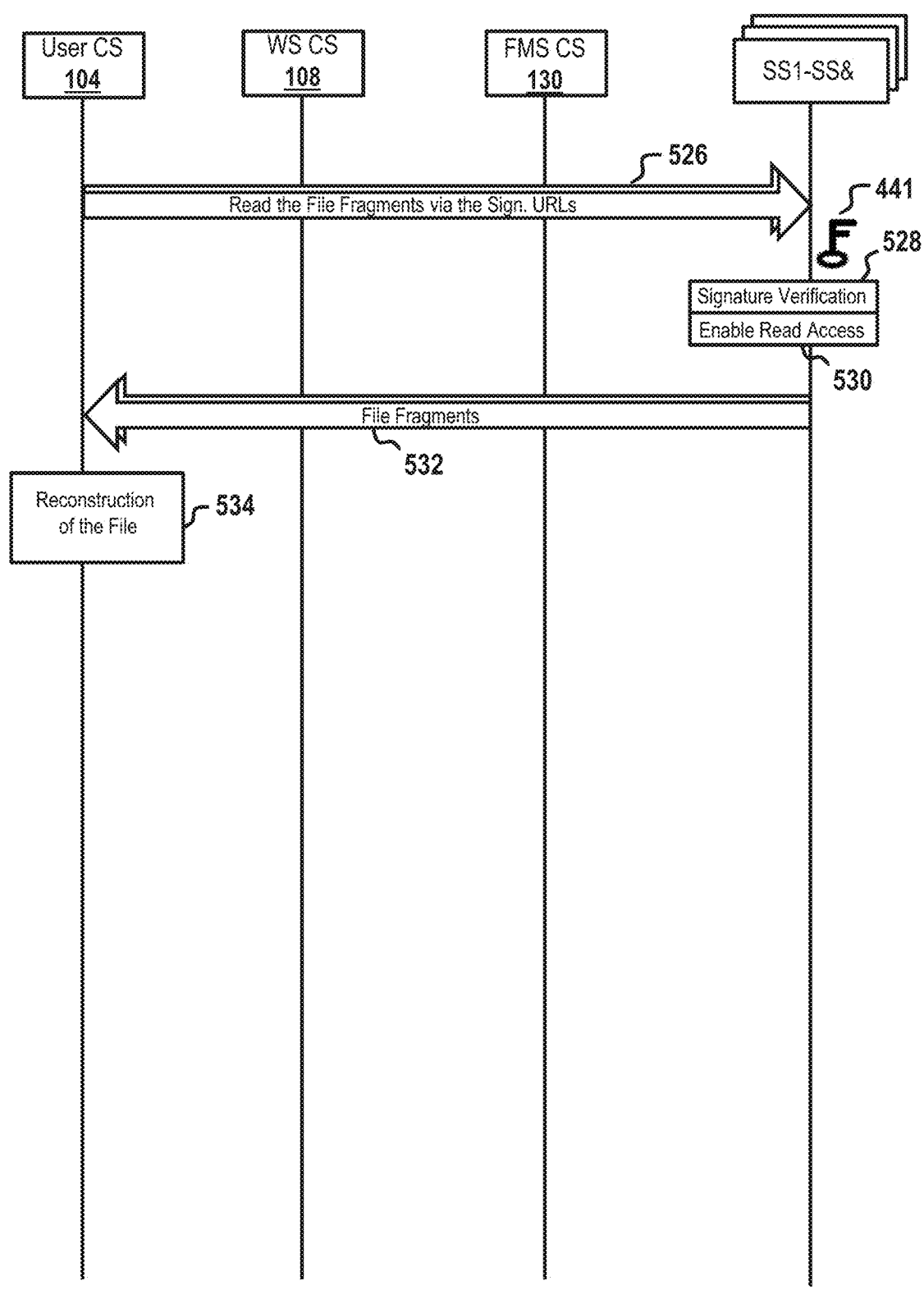
Figure 8:
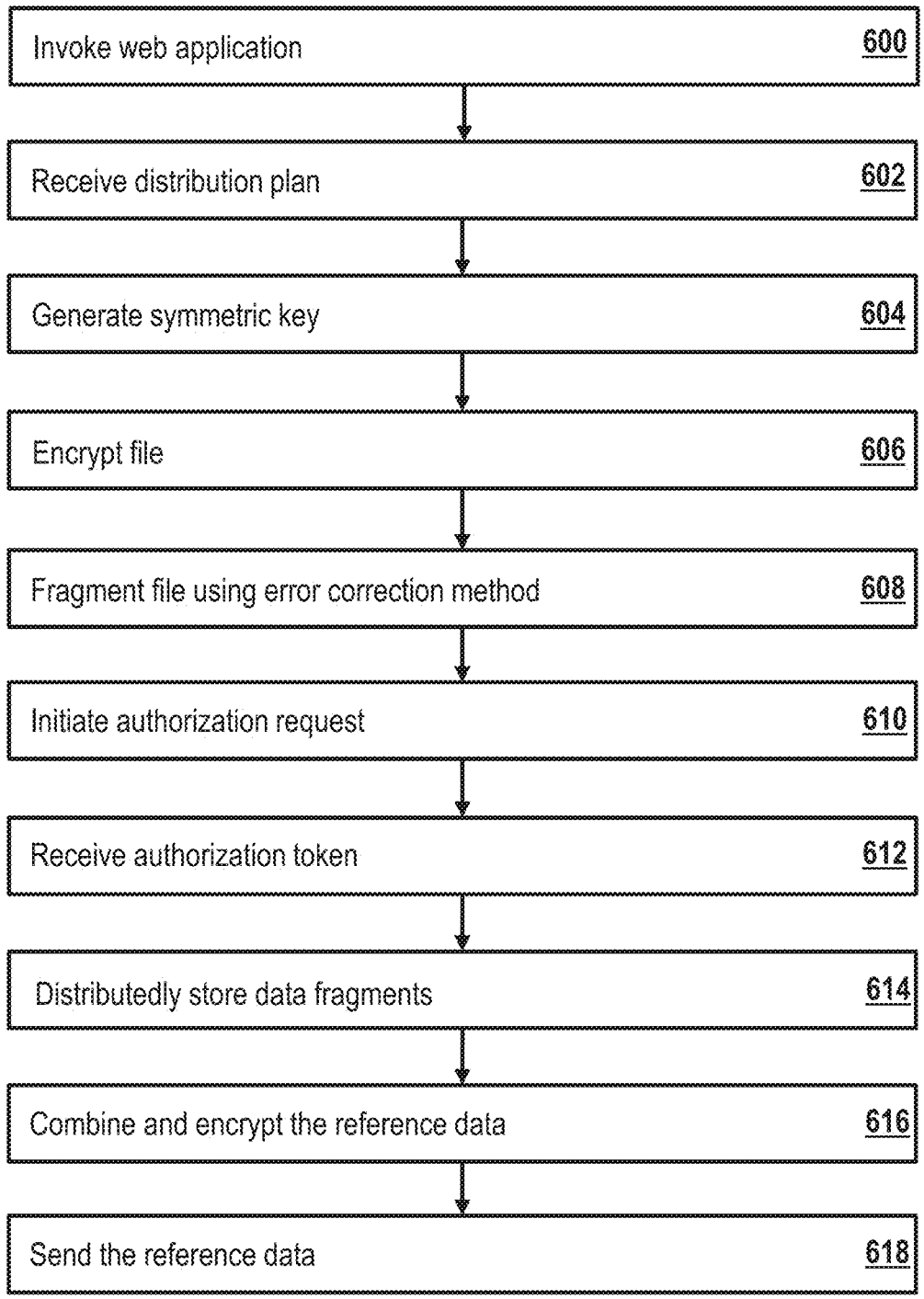
Figure 9:
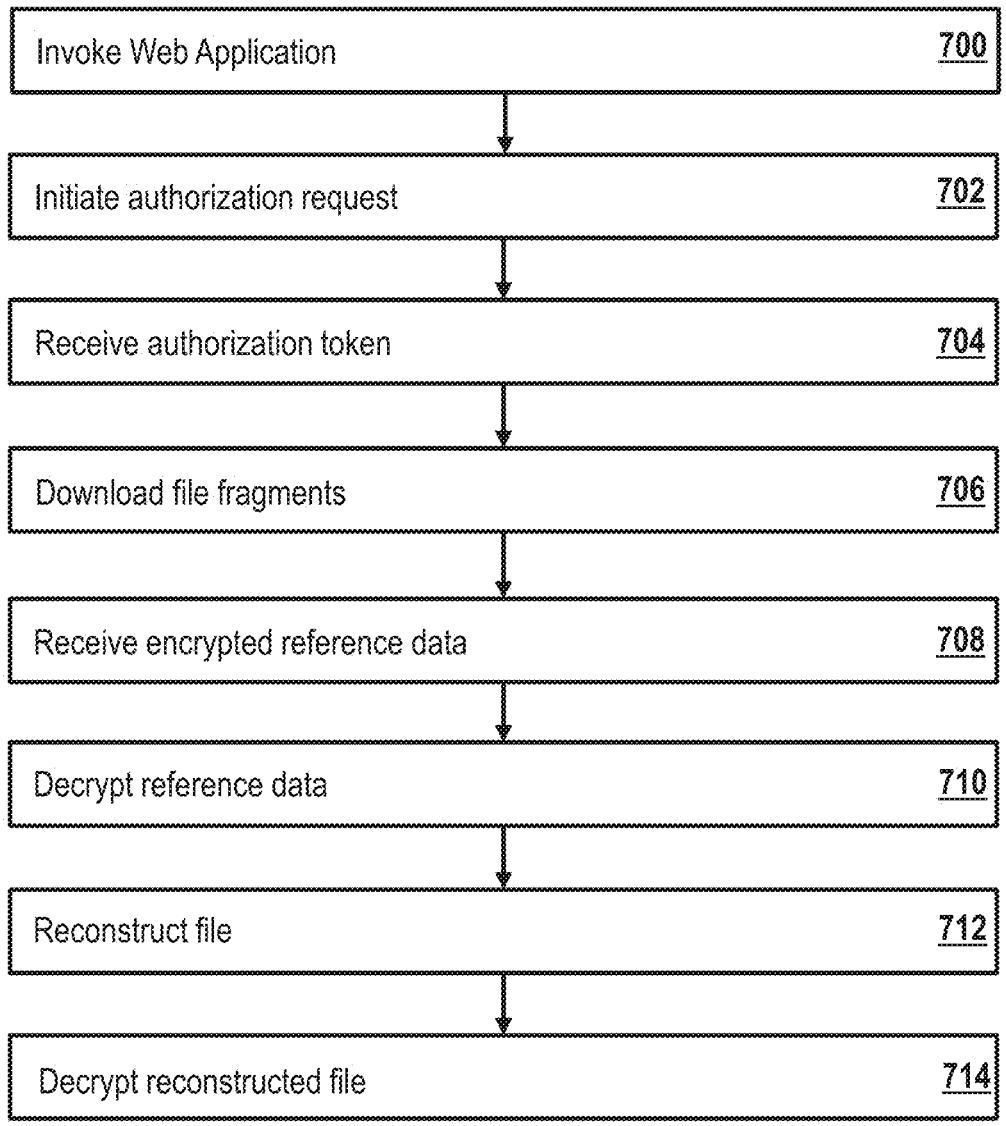

In the following, the embodiments of the invention are explained in more detail using the drawings, wherein:

FIG. 1 is a block diagram with a user computer system, a web server computer system, multiple storage services and a file management server computer system, FIG. 2 is a block diagram with multiple user computer systems, a web server computer system, multiple storage services and a file management server computer system, FIG. 3 is a block diagram of a user computer system, FIG. 4 is a block diagram of a web server computer system, FIG. 5 is a block diagram of a file management server computer system, FIG. 6 is a process diagram of distributed storing a file, FIG. 7 is a process diagram of reading a file stored in a distributed manner, FIG. 8 is a flowchart of distributed storing a file, FIG. 9 is a flowchart of reading a distributedly stored file.

In the following embodiments, similar elements are marked with the same reference numbers.

FIG. 1 shows a distributed infrastructure for cryptographically secured storage of files using a web application running on a web browser. The infrastructure comprises a user computer system 104, which comprises a web browser for running a web application. The corresponding web application is provided by a web server computer system 108 for retrieval over the network, such as the Internet, using a web browser. For example, the web application is an existing web application via which services of the web server computer system 108 may be accessed according to a client-server protocol. This web application is supplemented by an upload web module for uploading files for storage and a download web module for downloading files for access, which are integrated into the web application and enable it to store and retrieve files in a form of cryptographically secured file fragments F1-F3 in a distributed manner without additional programs.

For storage, the files are cryptographically secured by encrypting and fragmenting them so that no conclusions may be drawn about the data content of the original file on the basis of individual file fragments F1-F3. The fragmentation is carried out according to a distribution plan 416, which also identifies the storage services SS1-SS4 on which the file fragments F1-F3 are to be stored. The corresponding distribution plans 416 are managed by a file management server computer system 130, for example. If the necessary information regarding the storage services SS1-SS6 is provided to the user computer system 104, for example via the web application, the user computer system 104 may also generate the distribution plan via the web application.

Web server computer system 108 authenticates itself to the file management server computer system 130 with the authentication data 109 to provide upload and download functionality to one or more user computer systems 104 via the web application. User 102 does not need to register with the file management server computer system 130 or the SS1-SS4 storage services. In addition, the web server computer system 108 manages reference data, which associates the files with the distribution plans 416 and users 102 of the user computer systems 102. Using the appropriate reference data, the web server computer system 108 may enable user 102 to access the distributed stored data at any time during the execution of the web application in the web browser on user computer system 104.

FIG. 2 shows a distributed file storage infrastructure comprising multiple user computer systems 104, 162, 168, a web server computer system 108, multiple storage services SS1-SS6 with corresponding dedicated IT infrastructures 180-192 and storage media SM1-SM6, and a file management server computer system 130, each of which is communicatively or operationally connected to the other over the network 178. The system enables automated and dynamic provisioning of storage resources of the individual storage services, which may, for example, each be adapted as public cloud storage services. The provision is integrated as a functionality into a web application provided by the web server computer system 108 over the network 178. Storage services are preferably selected dynamically based on requirements specified by the web server computer system 108. For example, a minimum level of security is required. For example, storage services SS1-SS6 that are eligible or available for storage are stored in a centrally stored catalog 329 of the Web Server Computer System 108 or File Management Server Computer System 130.

For example, user 102 may be assigned two user computer systems 104, 162, for example a desktop computer and a notebook, each of which has a network interface and a web browser.

For example, each of the user computer systems 104, 162 comprises a specific asymmetric cryptographic key pair 136, 138; 164, 166. The private key 138, 166 is stored in a protected manner in the respective user computer system. Copies of the corresponding public keys 136, 164 are transferred to the web server computer system 108 and centrally managed by it. The File Management Server Computer System 130 may also have copies of the corresponding public keys 136, 164. For example, user 102 is assigned the user profile 174, which contains the two public keys 136 and 164. The other user 160 is assigned the user profile 176, which contains the public key 170. The private key 172 corresponding to the public key 170 is stored on the additional user computer system 168. This enables the web server computer system 108 which, for example, is able to cryptographically protect reference data by encrypting it with one of the public keys so that only the owner of the corresponding private key may access it. According to embodiments, a user's private key may also be stored on a mobile, portable hardware token so that the user can use it on a plurality of user computer systems 104, 162. For example, if the File Management Server computer system 130 also has copies of the corresponding public keys, it may encrypt distribution plans 416 in a similar manner.

The two dotted arrows in FIG. 2 indicate, with respect to file fragments F1 and F2, that file fragments F1-F4 created by the ECM error correction procedure from file 101 are stored directly, using a permission token, bypassing Web Server Computer System 108 and File Management Server Computer System 130. However, in order to obtain the authorization tokens issued by each storage service, user computer system 104 must interact with web server computer system 108 via the web application, which causes file management server computer system 130 to request the authorization tokens. The web server computer system 108 acts as a central instance to organize the distributed storage.

FIG. 3 shows a block diagram of the user computer system 104. The user computer system 104 includes a user interface 134. The interface may include, for example, a graphical user interface that displays a web browser 106 running on the user computer system 104. In addition, the Interface may comprise input devices, such as a keyboard or mouse, that allow the user to invoke the web application and/or select files to upload or download using the web application. The User Interface 134 may also be used to authenticate the user to the web server computer system. For this purpose, the user interface 134 comprises, for example, one or more sensors for capturing one or more biometric features of the user 102. The user computer system 104 comprises a processor 135 and a non-volatile storage medium 105 on which the web browser 106 for invoking and executing web applications 107 is installed. The web applications 107 are executed by the web browser but are not installed on the user computer system 104. The web browser 106 may communicate with the web server computer system 108 via interface 131, in particular web application 107 can be called up via interface 131. Services may also be used. The web application 107 communicates via interface 131, for example, with a server application 354 installed on the web server computer system 108. In addition, indirect communication with the file management server computer system 130 via the web server computer system 108 using interfaces 132 and 133 is enabled, for example. The web application 107 may also provide interfaces 116-128 that define standardized file operations ("CRUD": "CREATE", "READ", "UPDATE", "DELETE") that can be interpreted and performed by each of the storage services. The interfaces 116-128 are therefore ultimately a uniform interface with a uniform method signature for CRUD operations.

The web application 108 comprises modules for implementing the storage function. This is, for example, an encryption/decryption module 110, which stores and/or generates, for example, symmetric keys and/or asymmetric keys 136, 138. These keys are used to encrypt and/or decrypt files, reference data and/or distribution plans. For example, the symmetric key may be a hash value of the file 101 to be encrypted, which can be used to encrypt the corresponding file before fragmentation and decrypt it again later. For example, after the symmetric key is added to the reference data, it is deleted so that it is only available as part of the reference data. Furthermore, the unencrypted reference data is deleted after it has been encrypted, for example, so that it is only available in encrypted form. According to embodiments, module 110 is also used to encrypt and decrypt file fragments of the encrypted file. It also manages the public key 136. For example, it transmits the public key 136 via the interface 132 to the web server computer system 108 and/or the file management computer system 130. In addition, the encryption/decryption module 110 uses the public key 136 to encrypt reference data or at least symmetric keys of the files stored in distributed storage. The module 110 thus allows the generation and use of symmetric keys and the use and management of the public and private keys 136, 138.

In addition, the web application 107 may comprise a fragmentation/defragmentation module 111 which may decompose a file 101 encrypted with the symmetric key by means of the module 110 into several file fragments F1-F4 by applying an error correction method FKV specified in a distribution plan and enrich it with error correction bits. If one or more of the storage services on which file fragments of the file are stored should fail, the defragmentation function of module 111 may regenerate the original file from the remaining file fragments, provided that the error correction bits contained in the remaining file fragments are sufficient for this.

A further Module 112, here referred to as the Distribution/Aggregation Module, contains several functionalities for the distributed and secure storage of the file fragments generated by Module 111 in the storage services SS2, SS4-SS6 specified in the distribution plan. For example, module 112 may calculate a hash value of the original file 101. In addition, a hash value of each of the generated file fragments F1-F4 may be calculated, which serve as identifiers of the file fragments and which are mapped to the original file name of the file. The symmetric key, the hash values and the mapping may serve as reference data to enable a reconstruction of the file from the file fragments. In addition, the reference data may include identifiers and paths of the storage services in which the file fragments were stored.

Furthermore, the reference data may identify the location of the distribution plan for the reconstruction of the corresponding file 101. For example, the reference data 404 of the file 101 generated by a user computer system 104, or at least the symmetric key, are encrypted by a public key 136 that is specifically assigned to the user computer system 104 and thus also to the user 102, and are transmitted in encrypted form to the web server computer system 108 over the network 178. If the user computer system 104 is to access the distributed stored file 101 at a later point in time, it may receive the reference data from the web server computer system 108 while running the web application 107 and decrypt the encrypted reference data with the symmetric key using the private key 138. For example, the aggregation functionality of module 112 allows the original file 101 to be reconstructed from the file fragments F1-F4 using the reference data 440 and the distribution plan 416. The reconstructed file may be decrypted using module 110 and the symmetric key.

FIG. 4 shows a block diagram of the Web Server Computer System 108, which comprises a processor 350 and a non-volatile storage device 352, on which a Server Application 354 is installed. This may be used to manage multiple profiles 356 of web applications 107 or the registered users of web applications 107, for example, web application profile 174 of user 102 or web application profile 176 of user 160. For example, web application profile 174, 176 comprise public keys 136, 164, 170, which are assigned to the corresponding users 102, 160. Furthermore, the profiles 356 may comprise one or more reference data lists 362, 364, in which 107 reference data of the files stored on the storage services distributed via the web application are stored for specific or all users of the web application. For example, reference data 362, 364 is stored in cryptographically secure form, such as encrypted and/or with limited access, on the web server computer system 108.

In addition, the Web Server Computer System 108 includes, for example, a catalog of all storage services that are suitable or available for distributed storage.

The Web Server Computer System 108 provides web application 107 for retrieval over the network 178 using interface 132.

The module 366 of the server application 354 is responsible, for example, for the central administration of access rights and for the file-related check for access authorization by other users. While running the web application 107, a user may identify himself/herself to the server application 354 as authorized by proving his/her identity, which may consist of various attributes (name, e-mail address, bank account, residential address, date of birth, nationality, etc.) to the server application 354 in a trustworthy manner. The authenticity of these attributes may be confirmed with different efforts (e.g. a bank account by a bank transfer with a transmitted secret in the field "purpose of use", email by sending an email with a confirmation link, place of residence or date of birth, or by secure reading of the data from an electronic identity card).

Module 368 manages reference data of a plurality of files used and/or created in the course of the execution of web application 107, of a plurality of users registered with server application 354. Based on the reference data, module 338 may enable users 102, 160 to access the files stored in distributed form when using web application 107. All in all, according to embodiments, a flexible solution for secure and highly available data storage using several external storage services may be provided. Users may, if they have the appropriate permissions, access files stored in distributed storage using web application 107. They do not need to have specific client applications 108 installed.

Module 370 provides one or more services that may be accessed by users through the web application according to a client-server model.

FIG. 5 shows a block diagram of the file management server computer system 130, which comprises a 342 processor and a 302 non-volatile storage device on which a file management application 304 is installed. This may be used to manage multiple server profiles 306, for example, server profile 171 of web server computer system 108 and other server profiles 173 of other web server computer systems that provide web application with integrated file storage over the network 178. The web server computer systems may specify configurations 175, 179 of the respective profiles to determine which of the storage services SS1-SS6 available according to the catalog 329 are to be used for storing files or which requirements their IT infrastructures must meet in order to use them.

Thus, file management application 304, as a central instance, may manage the server profiles of several web server computer systems and also control and implement the specifications of the web server computer systems regarding the storage services SS1-SS6.

The module 330 of file management application 304 is, for example, responsible for the central administration of access rights and for the file-related check for access authorization. A web server computer system 108 may authenticate itself to file management application 304 using the authentication module 336.

The module 332 is used to request authorization tokens from the storage services specified in the distribution plan after a web server computer system 108 has proven its authority to provide access to a file against file management application 304. The authorization tokens are signed with a signature key 334 of the file management application 304 and sent in signed form to the web server computer system 108 from which an appropriate authorization request for file access has been received. The web server computer system 108 then forwards the corresponding authorization tokens to a user computer system, for example, via a web application.

The module 338 manages distribution schedules of a plurality of files generated, for example, by web server computer systems or user computer systems. The distribution plans may help identify where the file fragments are stored and how to defragment them. Alternatively, Module 338 itself may enable dynamic generation and routing of distribution plans for distributed storage of a file 101, wherein the distribution plan specifies an error correction method (ECM) and multiple SS1-SS6 storage services.

Figure 6A:
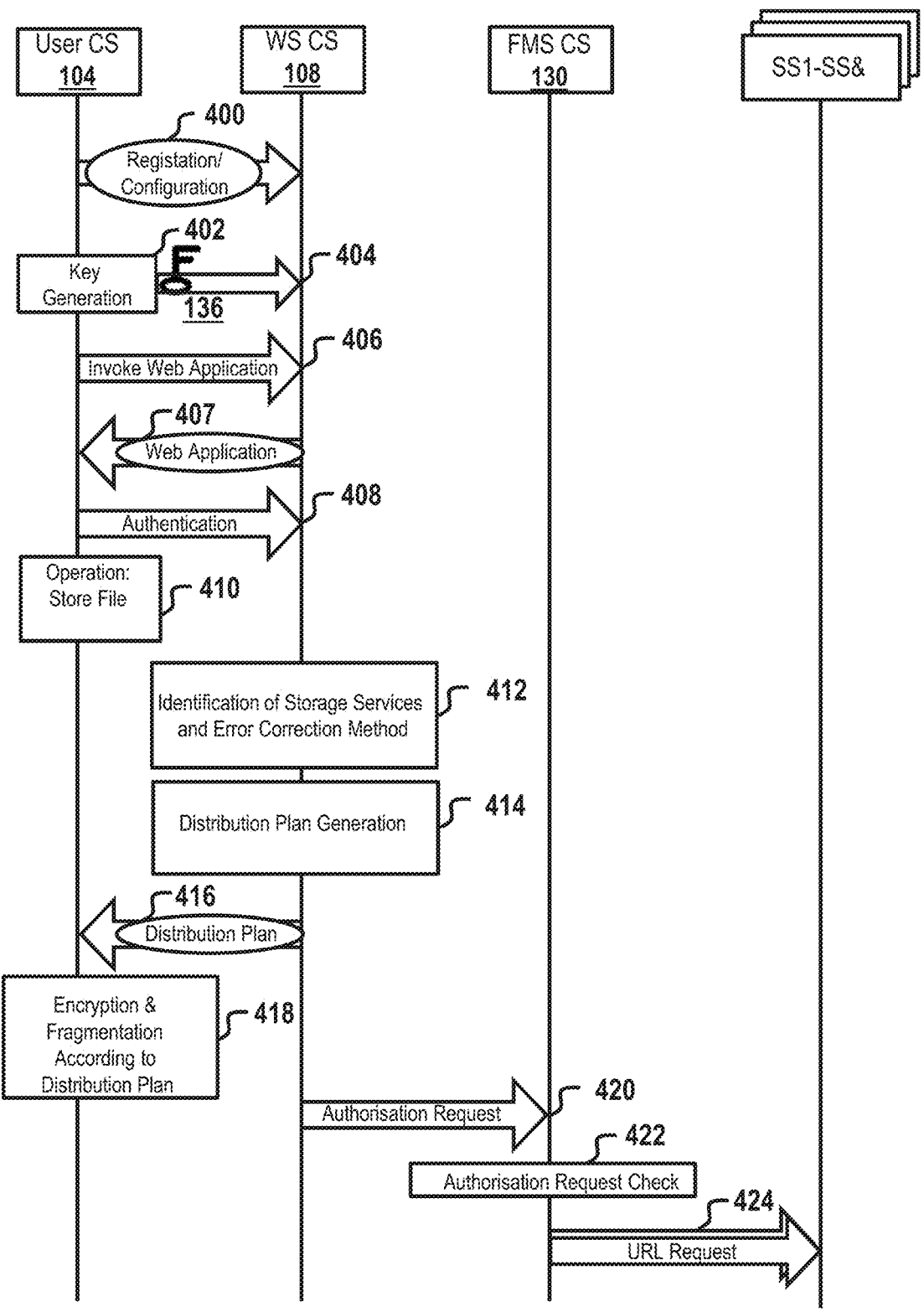
Figure 6B:
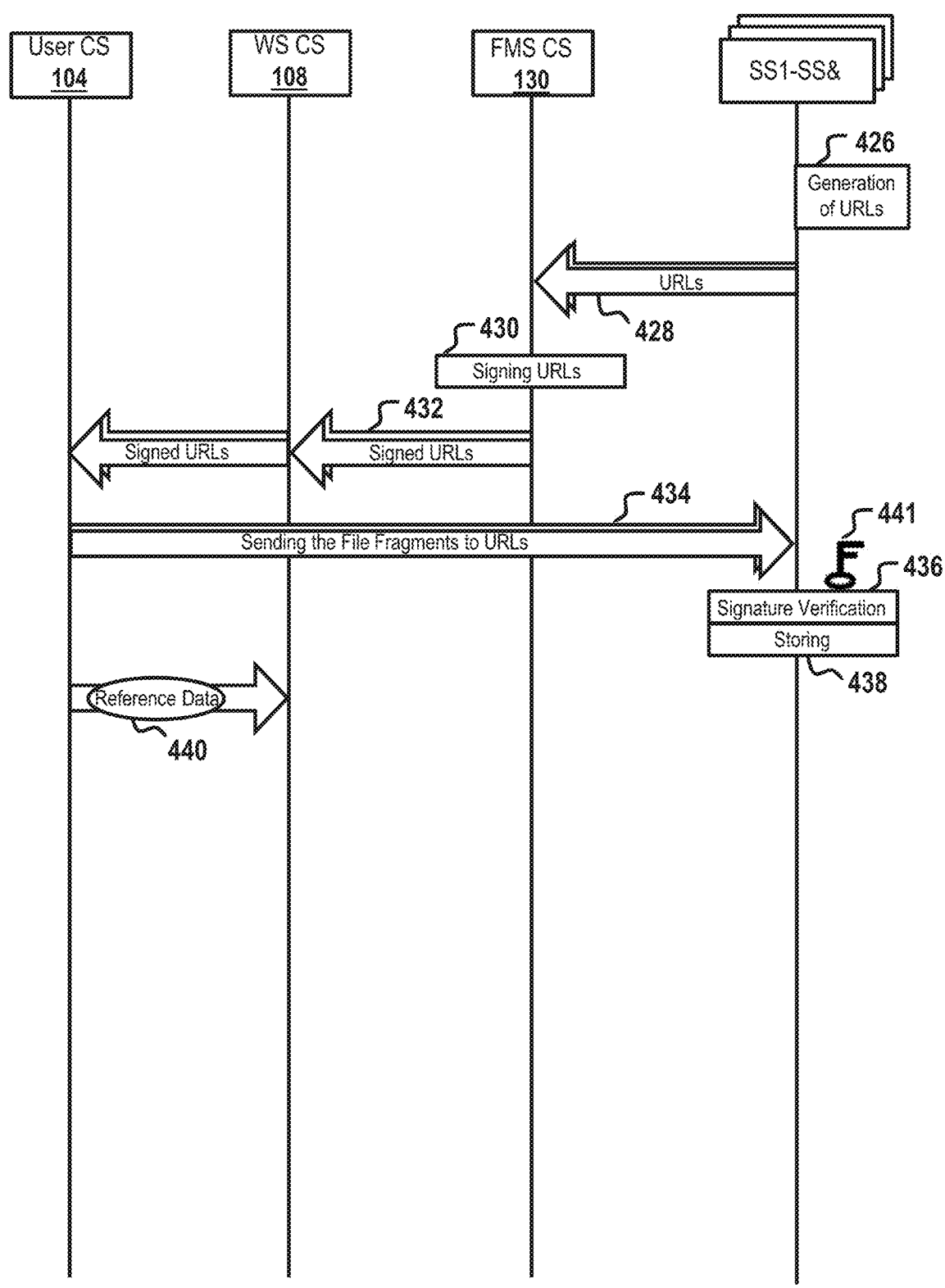

FIGS. 6A and 6B show the process of distributed storing a file according to an embodiment. In step 400, the user registers with the web server computer system 108 or a service provided by the web server computer system 108. In step 402, a public encryption key 136 is generated, and in step 404 it is transferred to the web server computer system 108 via interface 131. For example, the public key 136 may be transmitted during or after the user's registration 400 with the web server computer system 108. For example, the user computer system 104 comprises the public cryptographic key 136, that is, the public encryption key. The corresponding private key 138, i.e., the private decryption key, is stored in a protected memory area of the user computer system 104 or an additional hardware token.

In step 406, the web application provided by the web server computer system 108 is invoked through a web browser of the user computer system 104. In step 407, in response to the request in step 406, the user computer system 104 receives program instructions to run the web application in the web browser on the user computer system 104. In step 408, the user of the user computer system 104 authenticates to the web server computer system 108 using the web application.

To store a determined file in a distributed manner, a decentralized storage operation is required to access or include multiple storage services. In step 410, the user or the user computer system initiates such a storage operation to store a file in a distributed manner across multiple storage services. In step 410, for example, a symmetric key is generated to encrypt the file to be stored in a distributed manner. In step 418, the file is encrypted with the generated key. The encryption is done for example with a hash value of file 101, which serves as a symmetric cryptographic key.

For storage on the storage services, however, there is no direct authentication with the individual storage services or the file management server computer system by the user computer system 104. Instead, the user computer system 104 only authenticates itself to the web server computer system 108 in step 408. According to embodiments, authentication may also take place when invoking the web application.

In step 412, the web server computer system 108 automatically identifies the identity and number of storage services to be used to store file fragments of the file 101 to be stored. In addition, the web server computer system 108 identifies an error correction method for fragmenting the file to be stored. It is further verified that the error correction method distributes the file among file fragments in such a way as to ensure requirements for the availability of the file. In general, the higher the proportion of error correction bits per file fragment, the larger the amount of data to be transmitted over the network and the greater the redundancy of the transmitted data, but also the higher the availability of the file despite a possible failure of one or more of the storage services.

In step 414, the web server computer system 108 generates a distribution plan containing identifiers of the detected storage services as well as instructions for performing the detected error correction method (for example, configuration data of the error correction method). In step 416, the distribution plan is transmitted to the user computer system 104 over the network. Alternatively, in some embodiments the distribution plan may be generated by the user computer system 104. The user computer system 104 encrypts file 101 in step 418 and generates several file fragments F1-F4 of the encrypted file in step 418 using the error correction method specified in the distribution plan. According to embodiments, the individual file fragments may be encrypted again with the same or another symmetric key.

In order to be able to store the generated file fragments, the web server computer system 108 sends an authorization request in step 420 to the file management server computer system 130, wherein this authorization request includes a request whether the web server computer system 108 is authorized to have write access to the storage services or their storage media specified in the distribution plan in order to store the file fragments there. In response to receiving the authorization request, the file management server computer system 130 checks in step 422 whether the Web server computer system 108 is authorized for the requested write operation. If this is the case and the web server computer system 108 has also successfully authenticated itself to the file management server computer system 130, the file management server computer system 130 requests SS1 SS& authorization tokens over the network from the storage services specified in the distribution plan and the authorization request in step 424. For example, the authorization tokens may be adapted as URLs 428. In response to the receipt of the request, each storage service SS1-SS& generates URLs to access a storage area of storage media of the respective storage services in step 426 and sends the URLs to the file management server computer system 130 in step 428. The file management server computer system 130 signs the received URLs in step 430 and forwards them in signed form 432, for example, through the web server computer system 108, to the user computer system 104.

The user computer system uses the signed URLs to directly access the memory areas of the memories of the individual storage services specified in the URLs by means of these URLs and to store the file fragments F1-F4 directly in the storage media of said storage services SS1-SS& over the network, bypassing the file management server computer system 130 in step 434. However, in step 436, each storage service performs signature verification of the signed URLs using a signature verification key that forms an asymmetric cryptographic key pair with the signature key 334 of the file management server computer system 130. For example, file fragments are only stored in step 438 if the verification shows that the signature of the URL is valid.

In step 440, the symmetric cryptographic key used to encrypt the file is added to reference data for the distributed file 101 and sent to the web server computer system 108 for storage. The reference data may also include information about the user, the file, the keys used to cryptographically secure the file, and/or the distribution plan location. For example, the reference data is stored encrypted by the web server computer system 108. Similarly, the distribution plan identified by the reference data is stored in encrypted form by the file management computer system 130, for example.

FIGS. 7A and 7B show a flowchart of a read access of a user computer system 104 of another user 160 to the distributedly stored file 101. In step 500 the web application provided by the web server computer system 108 is invoked or requested via a web browser of the user computer system 104. In step 502, in response to the request from step 500, the user computer system 104 receives program instructions to run the web application in the web browser on the user computer system 104. In step 504, the user of the user computer system 104 authenticates to the web server computer system 108 using the web application.

During the execution of the web application, the need to access a distributed stored file 101 arises. This process, i.e. the initiation of a read access, is represented as read operation 506. In order to be allowed read access to the file 101, the user computer system 104 receives reference data 440 from the web server computer system 108 in step 508, which are assigned to the file 101 to be read. In step 510, the user computer system 104 and/or the web server computer system 108 also analyzes the reference data 440, and if necessary, the user computer system 104 provides at least a portion of the decrypted reference data 440 to the web server computer system 108 for this purpose.

In step 512, the web server computer system 108 sends an authorization request to the file management server computer system 130, wherein said authorization request includes a request to determine whether the web server computer system 108 is authorized to have read access to the storage services or storage media specified in the distribution plan to download the file fragments from there. In response to receiving the authorization request, the file management server computer system 130 checks in step 514 whether the web server computer system 108 is authorized for the requested write operation. If this is the case and the web server computer system 108 has also successfully authenticated itself to the file management server computer system 130, the file management server computer system 130 requests SS1 SS& authorization tokens over the network from the storage services specified in the distribution plan and in the authorization request in step 516. For example, the authorization tokens may be adapted as URLs 520. In response to the receipt of the request, each storage service SS1-SS& generates URLs to access a storage area of storage media of the respective storage services in step 426 and sends the URLs to the file management server computer system 130 in step 520. The file management server computer system 130 signs the received URLs in step 522 and forwards them in signed form, for example, through the web server computer system 108, to the user computer system 104 in step 524.

The signed authorization tokens 524 enable the user computer system 104 to perform direct read access 526 to the storage media of the respective storage services using the signed URLs. For example, read access is only permitted by the respective storage services if a signature check using the signature check key 441 in step 528 by the respective storage services shows that the signature of the authorization token is valid. In this case, the storage services give permission to read the respective stored file fragments in step 530. The file fragments are transferred directly to the user computer system 104 over the network in step 532.

In step 534, the received file fragments are assembled to the original encrypted file 101 by the web application running in the web browser on the user computer system 104. If the individual file fragments 530 are each additionally encrypted, they are decrypted before assembly or reconstruction using appropriate keys that identify, for example, the reference data. Furthermore, the reconstructed file 101 is finally decrypted by the user computer system 104 using the corresponding symmetric key.

FIG. 8 shows a method for storing a file 101 using multiple storage services over the network using a web application running in a web browser. In step 600, the corresponding web application is invoked from a web server computer system 108 using the web browser over the network, such as the Internet, and executed in the web browser on the user computer system 104. In step 602, a distribution plan for fragmenting and distributed storage of the file 101 is received by the web application. In step 604, the web application generates a symmetric key 139 to encrypt the file 101 to be stored. In step 606, the file 101 is encrypted with the symmetric key 139. In step 608, the web application on the user computer system 104 performs an error correction procedure specified in the distribution plan and generates file fragments that are to be stored in multiple storage services according to the distribution plan. To this end, in step 610, the web application initiates an authorization request by web server computer system 108 to a file management computer system 130 for storing the file 101 using the storage services specified in the distribution plan 416. In response to receiving the authorization request, the file management computer system 130 requests an authorization token from each of the storage services in which a file fragment is to be stored. In step 612, the file management computer system forwards the authorization token to the user computer system 104 via the web server computer system 108. According to some embodiments, the authorization tokens are additionally signed by the file management computer system 130 before forwarding. In step 614, the user computer system 104 proves its authorization to write the file fragments in the individual storage services by using the authorization tokens and, after successful proof of authorization, stores the generated file fragments in the storage media of the corresponding storage services, bypassing the web server computer system 108 and the file management server computer system 130. In step 616, the user computer system generates 104 reference data of the distributed stored file and encrypts it with a public key 136 which forms an asymmetric cryptographic key pair with a private key 138 stored in a protected storage area of a hardware token. In step 618, the reference data is sent from the user computer system 104 to the web server computer system 108 via the web application for storage.

FIG. 9 shows a method for reconstructing a file 101 stored on multiple storage services distributed over the network using a web application running in a web browser. In step 700, the corresponding web application is invoked from a web server computer system 108 using the web browser over the network, such as the Internet, and executed in the web browser on the user computer system 104. In step 702, the web application initiates an authorization request from the web server computer system 108 to the file management server computer system 130 for access to the file 101 distributedly stored by the storage services specified in the distribution plan 416. In response to receiving the authorization request, the file management server computer system 130 requests an authorization token from each of the storage services in which a file fragment is stored. In step 704, the file management server computer system 130 forwards the data that is stored in the storage services to the web application through the web server computer system 108. According to some embodiments, the authorization tokens are additionally signed by the file management server computer system 130 before forwarding. In step 706, the user computer system 104 or the web application uses the permission tokens to prove its permission to download the file fragments to each storage service and, after successfully proving its permission, receives the stored file fragments from the storage media of each storage service, bypassing the web server computer system 108 and the file management server computer system 130. According to embodiments, in step 708, the web application additionally receives from the web server computer system 108 encrypted reference data for reconstructing the distributedly stored file 101, wherein in the case of the encrypted reference data, for example, at least the symmetric key comprised by the encrypted reference data is encrypted by an asymmetric encryption method. In step 710, the web application decrypts the reference data. In step 712, the web application on the user computer system 104 performs an error correction method specified in the distribution plan and reconstructs the encrypted file 101 from the file fragments. In step 714, the encrypted file 101 is decrypted with the corresponding symmetric key.

LIST OF REFERENCE NUMBERS

F1-F4 File fragments
ECM Error correction method
SS1-SS6 Storage services
SM1-SM6 Storage media
180-192 IT infrastructure of storage services
101 File
102 Users
104 User computer system
105 Storage medium
106 Web browser
107 Web application
108 Web server computer system
109 Authentication data
110 Encryption/decryption module
111 (De-)Fragmentation module
112 Distribution/aggregation module
113 Service module
114 Upload module
115 Download module
116-128 Standardized interfaces
130 File management server computer system
131 Interface
132 Interface
133 Interface
134 User interface
135 Processor
136 Public key
138 Private key
160 Users
162 User computer system
164 Public key
166 Private key
168 User computer system
170 Public key
171 Server profile
172 Private key
173 Server profile
174 User profile
175 Configuration
176 User profile
177 Distribution plans
178 Network
179 Configuration
302 Storage medium 304 File management application
306 Directory of several user profiles
329 Storage Services Catalog
330 Module for authorization management
332 Module for managing authorization tools
334 Signing key
336 Module for user authentication
338 Module for managing distribution plans
342 Processor
350 Processor
352 Storage medium
354 Sever application
356 Directory of several user profiles
362 Reference data list
364 Reference data list
366 Module for user authentication
368 Module for managing reference data
370 Service provision module
400-406 Steps
407 Web application
408-414 Steps
416 Distribution plan
418 Authorization request
422 Step
424 URL request
426 Step
428 Authorization token
430 Step
432 Signed authorization token
434 Transmitted file fragments
436-438 Steps
440 Reference data
441 Signature verification key
500-510 Steps
512 Authorization request
514 Step
520 Authorization token
522 Steps
524 Signed authorization token
524 Read access
526-530 steps
532 Transferred file fragments
534 Step
600-618 Steps
700-714 Steps

The invention claimed is:

1. A method for cryptographically secure storing of a file using a web application executed by a web browser on a user computer system of a user, the method comprising
invoking the web application from a web server computer system over a network by the web browser on the user computer system,
encrypting the file with a cryptographic key locally on the user computer system using the web application,
providing a distribution plan by the web application, wherein the distribution plan comprises instructions for fragmenting the file into a plurality of file fragments by means of an error correction method and identifiers of a plurality of mutually independent storage services in whose non-volatile storage media the generated file fragments are to be stored,
fragmenting the encrypted file on the user computer system by the web application into a plurality of file fragments by the error correction method according to the distribution plan, wherein at least one of the file fragments includes error correction bits,
sending the resulting file fragments by the web application over the network to the storage services identified by the distribution plan, wherein an authorization token is provided by the web server computer system for each of the storage services as proof of authorization to store the corresponding file fragment.

2. The method of claim 1, wherein the web server computer system provides a service via the web application, wherein the file to be stored comprises data generated and/or used in the course of executing the service.

3. The method of claim 1, wherein the providing of the distribution plan comprises generating the distribution plan on the user computer system by the web application.

4. The method of claim 1, wherein the providing of the distribution plan comprises receiving the distribution plan on the user computer system by the web application.

5. The method of claim 1, the method further comprising sending the distribution plan from the web application over the network to a file management server computer system for storage, and/or
encrypting the distribution plan.

6. The method of claim 1, wherein the authorization tokens are received by the web application on the user computer system from the file management server computer system, wherein the received authorization tokens comprise an authorization token of each of the plurality of storage services identified in the distribution plan, which were requested by the file management server computer system on command of the web server computer system and forwarded to the user computer system.

7. The method of claim 6, wherein the receiving of the authorization tokens requires successful authentication of the web server computer system against the file management server computer system.

8. The method of claim 1, wherein the sending of the file fragments by the web application to the identified storage services is performed bypassing the web server computer system and/or the file management server computer system, and/or
wherein the authorization tokens are implemented as URLs each enabling direct read access to a storage location identified by the URL on one of the storage media of one of the storage services.

9. The method of claim 1, the method further comprising creating reference data, which are associated with the file, serve to reconstruct the file from the distributedly stored data fragments and are stored by the web server computer system.

10. The method of claim 1, wherein the reference data comprises: an identifier of the user, an identifier of the file, an identifier of the distribution plan, an identifier of a cryptographic key for decrypting the encrypted file, an identifier of a cryptographic key for decrypting the encrypted distribution plan, a hash value of the complete file and/or hash values of the stored file fragments; and/or
wherein the reference data is stored by the web server computer system in a cryptographically secure form; and/or
wherein the web application communicates the reference data to a server module for managing reference data, which is executed by a processor of the web server computer system; and/or
wherein the reference data is stored by the web server computer system in a reference list comprising a plurality of reference data for a plurality of files of different users of the web application.

11. The method of claim 1, the method further comprising authenticating the user against the web server computer system; and/or
   wherein one or more modules for a distributed storage of the file on the storage services are integrated into the web application, and wherein the encryption, fragmentation and transmission are performed by executing the modules of the web application in the web browser by a processor of the user computer system.

12. The method of claim 1, wherein the method for downloading the cryptographically secured stored file using the web application executed by the web browser on the user computer system further comprises:
   invoking the web application from the web server computer system over the network by the web browser on the user computer system,
   providing the distribution plan of the distributedly stored file by the web application, wherein the distribution plan comprises instructions for defragmenting the file from a plurality of file fragments by means of an error correction method and identifiers of the plurality of mutually independent storage services in whose non-volatile storage media the file fragments are stored,
   providing by the web server computer system an authorization token of each of the storage services of at least a selection of the storage services in whose non-volatile storage media the file fragments are stored, wherein the file fragments included in the selection of the storage services are sufficient for a complete reconstruction of the file,
   downloading the file fragments from the individual storage services using the authorization tokens as proof of authorization for downloading,
   defragmenting the encrypted file from the file fragments on the user computer system by the web application using the error correction method in accordance with the distribution plan,
   decrypting the encrypted file with a cryptographic key on the user computer system by the web application.

13. The method of claim 12, wherein the web server computer system provides a service via the web application, and wherein data included in the downloaded file is used in the course of execution of the service by the web application; and/or
   wherein the providing of the distribution plan comprises receiving the distribution plan from the file management server computer system on the user computer system by the web application, and/or
   wherein the distribution plan is provided in encrypted form, and the providing further comprises decrypting the distribution plan on the user computer system by the web application.

14. The method of claim 12, wherein the providing of the authorization tokens on the user computer system by the web application comprises receiving the authorization tokens from the file management server computer system, which were requested by the file management server computer system on command of the web server computer system and forwarded to the user computer system.

15. The method of claim 14, wherein receiving the authorization tokens requires successful authentication of the web server computer system against the file management server computer system.

16. The method of claim 11, wherein the downloading of the file fragments by the web application from the identified storage services is performed bypassing the web server computer system and/or the file management server computer system; and/or
   the method further comprising receiving reference data associated with the file to be downloaded and serving to reconstruct the file from the distributedly stored file fragments, from the web server computer system by the web application on the user computer system; and/or
   wherein the downloading of the file requires successful authentication of the user against the web server computer system; and/or
   wherein one or more modules for a distributed storage of the file on the storage services are integrated into the web application and wherein the downloading, defragmentation and decryption are performed by executing the modules of the web application in the web browser by the processor of the user computer system.

17. The method of claim 1, wherein the method is executed on a user computer system comprising a processor, a network interface for operatively coupling the user computer system to a web server computer system and the storage services over the network, wherein the user computer system comprises a storage medium having the web browser executable by the processor, the web browser being configured to execute said method.

18. A web server computer system comprising a first processor, a first network interface for operatively coupling the web server computer system to a user computer system, the web server computer system comprising a first storage medium containing first program instructions, wherein the first program instructions are configured, when executed by the first processor, to send program instructions for executing a web application in a web browser on the user computer system over a network to the user computer system in response to receiving an invocation of a web application from a web browser on the user computer system over the network, wherein the web application is configured to perform the following method for cryptographically secure storing a file:
   encrypting the file with a cryptographic key locally on the user computer system using the web application,
   providing a distribution plan by the web application, the distribution plan comprising instructions for fragmenting the file into a plurality of file fragments by means of an error correction method and identifiers of a plurality of storage services in whose non-volatile storage media the generated file fragments are to be stored,
   fragmenting the encrypted file on the user computer system by the web application into a plurality of file fragments by the error correction method according to the distribution plan, wherein at least one of the file fragments includes error correction bits,
   sending the resulting file fragments by the web application over the network to the storage services identified by the distribution plan, wherein an authorization token is provided by the web server computer system for each of the storage services as proof of authorization to store the corresponding file fragment.

19. The web server computer system of claim 18, wherein the web server computer system is further configured to provide a service via the web application, wherein the file to be stored is generated in a course of execution of the service by the web application.

20. A file management server computer system comprising a second processor, a second network interface for operatively coupling the file management server computer system to the web server computer system of claim 18, to the user computer system and to the plurality of storage services over the network, wherein the file management server computer system comprises a second storage medium having second program instructions, the second program instructions being configured, when executed by the second processor, to perform the following method for cryptographically secure storing the file:

receiving an authorization request from the web server computer system to store file fragments of the file over the network in the plurality of storage services according to the distribution plan, wherein the file management server computer system does not provide any of the storage services, in response to receiving the authorization request, requesting a respective authorization token from each of the multiple storage services and forwarding the authorization tokens received in response to the request to the user computer system, storing the distribution plan, the distribution plan comprising instructions for defragmenting the file from the plurality of file fragments by means of the error correction method and the identifiers of the plurality of storage services in whose non-volatile storage media the file fragments are stored.

* * * * *

UNITED STATES PATENT AND TRADEMARK OFFICE
CERTIFICATE OF CORRECTION

| | | |
|---|---|---|
| PATENT NO. | : 11,675,922 B2 | Page 1 of 1 |
| APPLICATION NO. | : 16/958919 | |
| DATED | : June 13, 2023 | |
| INVENTOR(S) | : Patrick Hennig et al. | |

It is certified that error appears in the above-identified patent and that said Letters Patent is hereby corrected as shown below:

On the Title Page

Item (71) Applicant should read: Bundesdruckerei GMBH, Berlin (DE)

Signed and Sealed this
Eighth Day of July, 2025

Coke Morgan Stewart
*Acting Director of the United States Patent and Trademark Office*